(12) United States Patent
Nakamura et al.

(10) Patent No.: US 7,880,813 B2
(45) Date of Patent: Feb. 1, 2011

(54) CONTROL DEVICE AND CONTROL METHOD WITH CORRESPONDING ARRANGEMENT OF IMAGE REGIONS

(75) Inventors: Masakazu Nakamura, Osaka (JP); Hiroshi Hamasaka, Osaka (JP); Dominic Symons, Pasadena, CA (US)

(73) Assignee: Panasonic Corporation, Osaka (JP)

( * ) Notice: Subject to any disclaimer, the term of this patent is extended or adjusted under 35 U.S.C. 154(b) by 1047 days.

(21) Appl. No.: 10/569,294

(22) PCT Filed: Aug. 27, 2004

(86) PCT No.: PCT/JP2004/012807

§ 371 (c)(1),
(2), (4) Date: Nov. 8, 2006

(87) PCT Pub. No.: WO2005/022944

PCT Pub. Date: Mar. 10, 2005

(65) Prior Publication Data

US 2007/0133937 A1    Jun. 14, 2007

(51) Int. Cl.
*H04N 5/50* (2006.01)
*H04N 5/44* (2006.01)

(52) U.S. Cl. .................. 348/569; 348/734

(58) Field of Classification Search .......... 348/569, 348/564, 734, 553, 706; 725/37, 38, 151–153
See application file for complete search history.

(56) References Cited

U.S. PATENT DOCUMENTS

| | | | |
|---|---|---|---|
| 4,180,336 A | * | 12/1979 | Lonsdale .................. 400/491.3 |
| 5,367,316 A | | 11/1994 | Ikezaki |
| 5,410,326 A | * | 4/1995 | Goldstein .................. 348/734 |
| 5,414,471 A | * | 5/1995 | Saitoh et al. .................. 725/56 |
| 5,537,152 A | * | 7/1996 | Ishikawa .................. 725/56 |
| 5,691,778 A | * | 11/1997 | Song .................. 725/59 |

(Continued)

FOREIGN PATENT DOCUMENTS

EP    1 096 453 A2    5/2001

(Continued)

OTHER PUBLICATIONS

International Search Report for corresponding Application No. PCT/JP2004/012807, mailed Nov. 22, 2004.

(Continued)

*Primary Examiner*—Victor Kostak
(74) *Attorney, Agent, or Firm*—Renner, Otto, Boisselle & Sklar, LLP

(57) ABSTRACT

A control device includes a control section standing by to receive a control signal transmitted from a transmission section. The control section assigns, respectively to N or less control signals, instructions to be executed when the control signals are received, and generates a signal for drawing on a display device an operation menu which includes N image regions placed in an arrangement corresponding to the N sensing portions of the transmission section. Each image region represents an instruction assigned to a control signal which is transmitted when the corresponding sensing portion is pressed, such that the N instructions to be respectively assigned to the control signals are determined based on an operation state of an apparatus to be controlled in the standby state and the operation menu generated in an immediately previous standby state.

33 Claims, 19 Drawing Sheets

U.S. PATENT DOCUMENTS

| | | | |
|---|---|---|---|
| 5,737,028 A * | 4/1998 | Bertram et al. | 725/37 |
| 5,933,141 A * | 8/1999 | Smith | 725/39 |
| 6,417,869 B1 * | 7/2002 | Do | 715/718 |
| 6,567,133 B2 * | 5/2003 | Raijmakers et al. | 348/734 |
| 6,788,241 B2 * | 9/2004 | Arling et al. | 341/176 |
| 6,918,136 B2 * | 7/2005 | Shepherd | 725/141 |
| 7,071,865 B2 * | 7/2006 | Shibamiya et al. | 341/176 |
| 2001/0019367 A1 * | 9/2001 | Walton et al. | 348/734 |
| 2002/0054028 A1 * | 5/2002 | Uchida et al. | 345/173 |
| 2002/0060749 A1 * | 5/2002 | Funakoshi et al. | 348/569 |
| 2002/0071057 A1 * | 6/2002 | Kaneda et al. | 348/588 |
| 2005/0262535 A1 * | 11/2005 | Uchida et al. | 725/80 |

FOREIGN PATENT DOCUMENTS

| | | |
|---|---|---|
| JP | 2-254894 | 10/1990 |
| JP | 04-207694 | 7/1992 |
| JP | 07-131362 | 5/1995 |
| JP | 10-161794 A | 6/1998 |
| JP | 10-312261 | 11/1998 |
| JP | 2001-128025 A | 5/2001 |

OTHER PUBLICATIONS

Notice of Reasons for Rejection for corresponding Japanese Application No. 2005-513556 dated Nov. 2, 2010 (with English translation).

* cited by examiner

81

81

82

94

97

CONTROL DEVICE AND CONTROL METHOD WITH CORRESPONDING ARRANGEMENT OF IMAGE REGIONS

TECHNICAL FIELD

The present invention relates to a control device, and in particular to a control device for controlling an audio-visual apparatus.

BACKGROUND ART

Owing to the development of computer technology and data compression technology in recent years, it has become possible to record image information and audio information in the form of digital signals. As a result, it is becoming possible to record television broadcasts onto a hard disk drive, a DVD-RAM or a DVD-R in the form of digital signals. Since such digital signal processing has become possible, audio-visual apparatuses (hereinafter abbreviated as AV apparatuses) are being equipped with increasing functions.

Once recorded in the form of digital signals, even if the formats of such information may be different, image information and audio information can be converted to other formats relatively easily. Therefore, in order to enhance the user's convenience, AV apparatuses of different functions are being combined, and AV apparatuses which are capable of treating image information and audio information of a number of different formats are being developed.

For example, DVD video recorders which are recently on the market incorporate a hard disk drive and a rewritable DVD drive which uses a DVD-RAM or the like, and are able to record television broadcasts to the hard disk drive or the DVD drive, or play back television broadcasts which are recorded thereon. The image information which has been recorded to the hard disk drive or the DVD drive permits searching under various conditions. Moreover, such DVD video recorders are able to play back music which is recorded on a CD or a movie which is recorded on a DVD, according to their respective standards.

Furthermore, they have a slot in which a storage medium storing images that have been recorded with a digital camera can be inserted, and/or input/output terminals to be connected to a digital video camera, so that images from the digital camera or the digital video camera can be displayed on a television set, or recorded to the hard disk drive or the DVD drive.

As the functions of an AV apparatus increases, the instructions to be given by a user to the AV apparatus in order to execute many functions will also increase. For this reason, buttons (remote control keys) corresponding to the functions will also be provided on a remote controller (remote control) for giving instructions to the AV apparatus, thus leading to an increase in the number of buttons on the remote controller.

FIG. 25 shows an example of a remote controller for a conventional DVD video recorder. The remote controller 201 includes: a group of buttons 202 for turning ON/OFF the power of a television set and the power of a DVD video recorder; a group of buttons 203 for switching between input sources of the television set; a group of buttons 204 for switching the channel of the television set; buttons 205 for adjusting the sound volume; a group of buttons 206 for switching between a hard disk drive and a DVD drive; a group of buttons 207 for performing operations such as play back or fast-forward on the drive; a group of buttons 208 for moving a cursor in order to select a function which is displayed on a television screen; and a group of buttons 209 for selecting program scheduling or a timer function.

Since so many buttons are placed on the remote controller 201, it is becoming less easy for the user to find a button that has the intended function. Since the outer shape of the remote controller 201 must be designed to a size which allows the user to hold it in one hand, it would be necessary to make each button smaller and reduce the interspaces between adjoining buttons, in order to place many buttons in the limited space of the remote controller 201. This would result in problems such as the user's difficulty to press the buttons, and likeliness to press the wrong button by mistake.

DISCLOSURE OF INVENTION

The present invention aims to solve such problems of the conventional techniques, and provide a control device and control method which makes it possible to control a multi-functional apparatus, e.g., a combination AV apparatus, with a small number of buttons.

A control device according to the present invention comprises: a reception section for receiving a control signal from a transmission section which transmits, based on activation of N sensing portions (where N is an integer equal to or greater than two) placed in a predetermined arrangement, a control signal for giving an instruction to an apparatus to be controlled; and a control section for assigning, to the N or less control signals, instructions to be executed when the control signals are received, and generating a signal for drawing on a display device an operation menu which includes N image regions placed in an arrangement corresponding to the N sensing portions of the transmission section, each image region representing an instruction assigned to a control signal which is transmitted when the corresponding sensing portion is pressed, the control section standing by to receive a control signal transmitted from the transmission section.

In a preferred embodiment, each instruction is a control instruction for the apparatus, or an instruction for assigning next instructions to the control signals in a next standby state and causing the control section to generate a signal for drawing next image regions to be included in a next operation menu.

In a preferred embodiment, the next instructions include detailed control instructions for the apparatus concerning the instruction.

In a preferred embodiment, the next operation menu includes at least one of the image regions in a current standby state as well as the next image regions to be displayed in the next standby state.

In a preferred embodiment, the operation menu includes information other than instructions related to the apparatus to be operated.

In a preferred embodiment, N is nine, and the N image regions are arranged in three rows by three columns.

In a preferred embodiment, the operation menu is displayed in different colors depending on the standby state.

In a preferred embodiment, the operation menu is displayed at a different position on a screen of the display device depending on the standby state.

In a preferred embodiment, the control section comprises a memory for storing information representing an operation state of the apparatus to be controlled in the standby state.

In a preferred embodiment, one of the instructions assigned to the control signals is an instruction for maintaining a state of the apparatus to be controlled.

In a preferred embodiment, the control section assigns an instruction to each of the N control signals resulting from activation of the N sensing portions.

In a preferred embodiment, the instructions to be assigned to the control signals are determined based on an operation state of the apparatus to be controlled in the standby state and the operation menu generated in an immediately previous standby state.

In a preferred embodiment, a cursor control signal for moving a cursor is transmitted from the transmission section, and the control section generates a signal for drawing on the display device an image including: M image regions (where M is a natural number greater than N) each representing an instruction for the apparatus to be controlled; and a cursor which moves in accordance with the cursor control signal to specify the N image regions, and assigns instructions represented by the image regions specified by the cursor to control signals from the sensing portions corresponding to the image regions.

A control system according to the present invention comprises: any of the control devices defined above; and a controller including the transmission section and the N sensing portions.

A control system according to the present invention comprises: any of the control devices defined above; and a controller including the transmission section and the N sensing portions as well as a cursor movement sensing portion for moving the cursor.

In a preferred embodiment, the controller transmits the control signals by using infrared rays, ultrasonic waves, or radio waves as a carrier.

In a preferred embodiment, the N sensing portions are arranged in three rows by three columns.

In a preferred embodiment, a surface of a sensing portion which is positioned at the second row in the second column among the N sensing portions arranged in three rows by three columns feels differently from the other sensing portions.

In a preferred embodiment, the controller further includes a sensing portion for powering ON/OFF the apparatus to be controlled.

An audio-visual apparatus according to the present invention includes any of the control systems defined above.

A control method according to the present invention is a control method for transmitting, based on activation of N sensing portions (where N is an integer equal to or greater than two) placed in a predetermined arrangement, a control signal for giving an instruction to an apparatus to be controlled, and controlling the apparatus with the control signal, comprising: a step of assigning, to the N or less control signals, instructions to be executed when the control signals are received; and a step of generating a signal for drawing on a display device an operation menu which includes N image regions placed in an arrangement corresponding to the N sensing portions of the transmission section, each image region representing an instruction assigned to a control signal which is transmitted when the corresponding sensing portion is pressed.

In a preferred embodiment, each instruction is a control instruction for the apparatus, or an instruction for assigning next instructions to the control signals in a next standby state and causing the control section to generate a signal for drawing next image regions to be included in a next operation menu.

In a preferred embodiment, the next instructions include detailed control instructions for the apparatus concerning the instruction.

In a preferred embodiment, the next operation menu includes at least one of the image regions in a current standby state as well as the next image regions to be displayed in the next standby state.

In a preferred embodiment, the operation menu includes other information concerning the image regions and the apparatus to be operated.

In a preferred embodiment, N is nine, and the sensing portions are arranged in three rows by three columns.

In a preferred embodiment, the operation menu is displayed in different colors depending on the standby state.

In a preferred embodiment, the operation menu is displayed at a different position on a screen of the display device depending on the standby state.

In a preferred embodiment, the control section comprises a memory for storing information representing a current operation state of the apparatus to be controlled in the standby state.

In a preferred embodiment, one of the instructions assigned to the control signals is an instruction for maintaining a state of the apparatus to be controlled.

In a preferred embodiment, the step of generating a signal generates a signal for drawing on the display device an image including: M image regions (where M is a natural number greater than N) each representing an instruction for the apparatus to be controlled; and a cursor which moves in accordance with a cursor control signal to specify the N image regions, and the step of assigning assigns instructions represented by the image regions specified by the cursor to control signals from the sensing portions corresponding to the image regions.

In a preferred embodiment, the step of assigning assigns an instruction to each of the N control signals resulting from activation of the N sensing portions.

In a preferred embodiment, in the step of assigning, the instructions to be assigned to the control signals are determined based on an operation state of the apparatus to be controlled in the standby state and the operation menu generated in an immediately previous standby state.

BEST MODE FOR CARRYING OUT THE INVENTION

Figure 1:
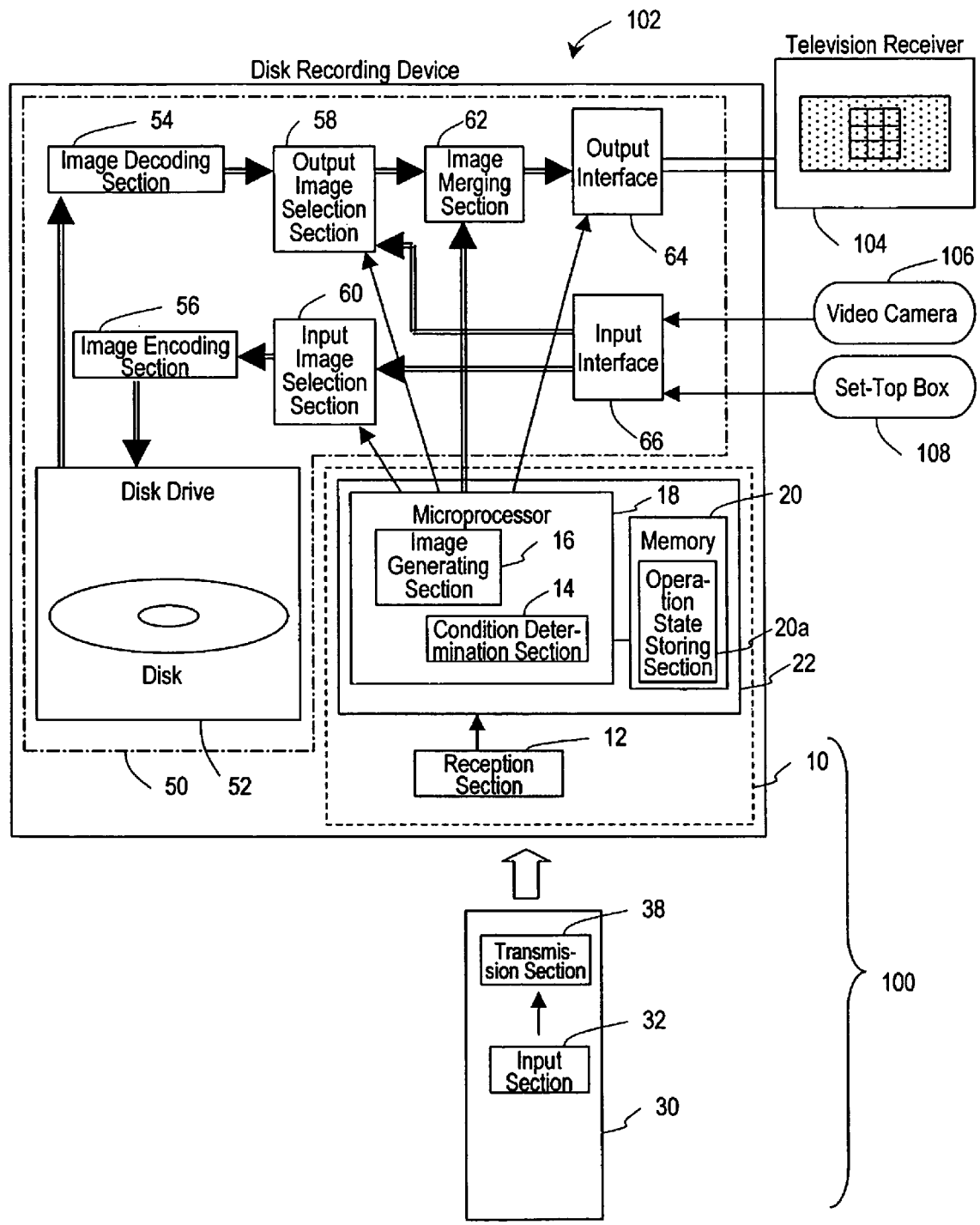
FIG. 1 is a block diagram showing a disk recorder, which includes one embodiment of a control device according to the present invention.

FIG. 1 is a block diagram showing one embodiment of the control device according to the present invention. Based on a control signal which is transmitted from a remote controller 30, a control device 10 of the present embodiment controls a recording section 50 that includes a rewritable disk drive 52, which uses a DVD-RAM or the like. As shown in FIG. 1, the control device 10 and the remote controller 30 constitute a control system 100 for controlling the recording section 50, and the control system 100 is incorporated in a disk recorder 102 which includes the recording section 50.

The recording section 50 of the disk recorder 102 includes a disk drive 52, an image decoding section 54, an image encoding section 56, an output image selection section 58, an input image selection section 60, an image merging section 62, an output interface 64, and an input interface 66.

To the input interface 66, a video camera 106 and a set-top box 108 for television broadcasts are connected, for example. The output of an antenna for television broadcasts may be directly connected without using the set-top box 108, and the television broadcasts may be analog or digital. Any AV apparatus other than the video camera 106 or the set-top box 108 may be connected. A signal which is input to the input interface 66 is sent to the input image selection section 60 and the output image selection section 58.

The input image selection section 60 selects one of a plurality of input signals which are input to the input interface 66, and outputs it to the encoding section 56. The encoding section 56 compresses the signal, and sends the compressed signal to the disk drive 52. The disk drive 52 records the signal received from the encoding section 56 to a hard disk, a DVD-RAM, or the like. The disk drive 52 may be a hard disk drive or a rewritable DVD drive, or may comprise both such drives.

A signal which is recorded on the disk drive 52 is input to the image decoding section 54, whereby a compressed signal is decoded. The decoded signal is input to the output image selection section 58. The output image selection section 58 outputs to the image merging section 62 a signal which is selected from among the signal received from the image decoding section 54 and the signal received from the input interface 66.

As will be specifically described below, the image merging section 62 receives from the control device 10 an image signal which is related to control, and overlays it on the signal received from the output image selection section 58. A display device 104, e.g. a television set, is connected to the output interface 64, so that an image which is based on the signal that is output from the image merging section 62 is displayed on the display device 104.

Figure 2:
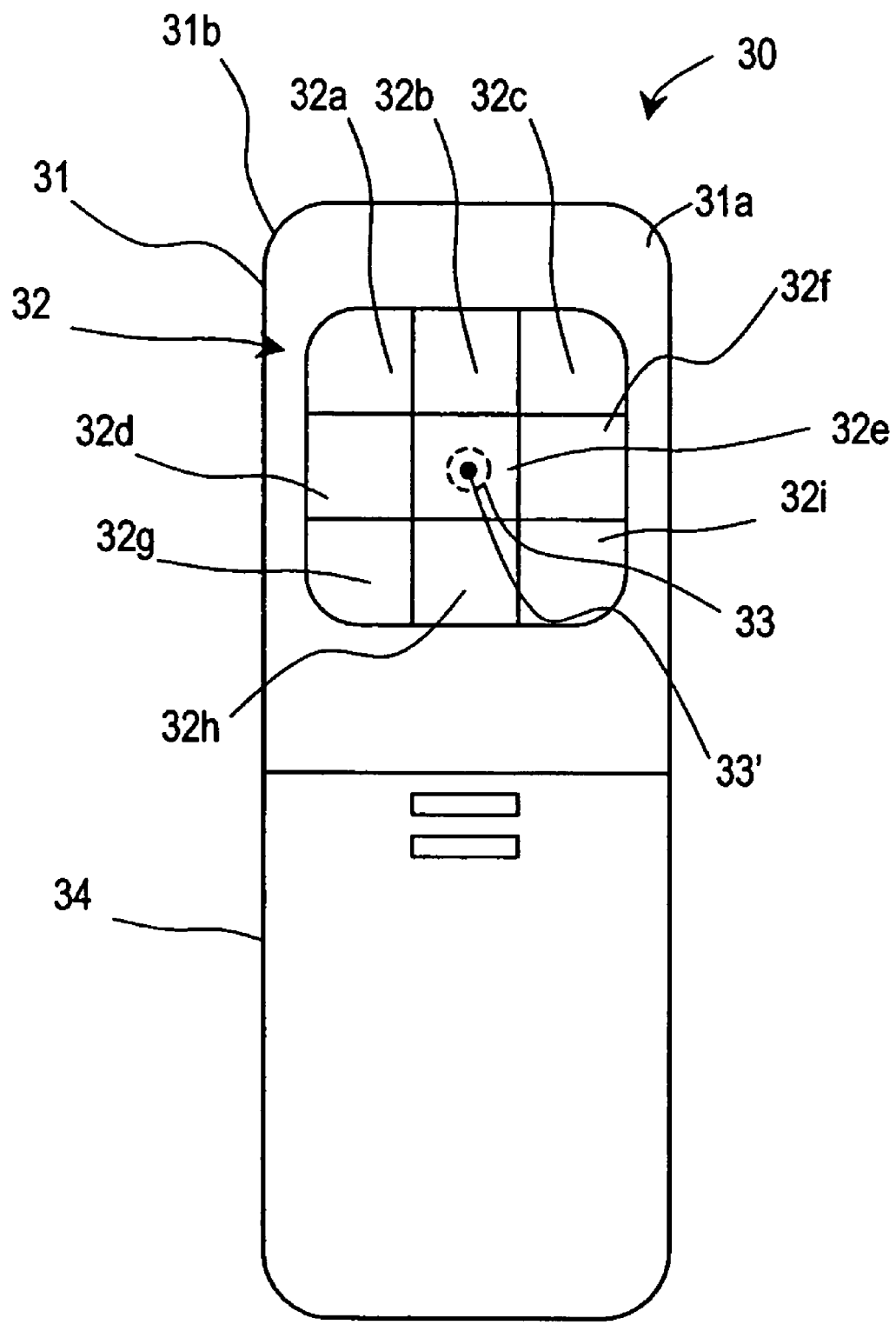
FIG. 2 is a plan view showing an example of a remote controller for sending instructions to the control device shown in FIG. 1.

Next, the control system 100 for controlling the recording section 50 will be described. First, the remote controller 30 for the control system 100 will be described. As shown in FIG. 1, the remote controller 30 includes a transmission section 38 and an input section 32. FIG. 2 shows an example of the exterior appearance of the remote controller 30. The remote controller 30 comprises a main body 31 for accommodating the transmission section 38, and an input section 32 which is provided on an upper face 31a of the main body 31. The input section 32 includes N sensing portions which are placed in a predetermined arrangement (where N is a natural number equal to or greater than two). The input section 32 is preferably composed of nine (i.e., N=9) sensing portions 32a to 32i, and more preferably, the nine sensing portions 32a to 32i are arranged in three rows by three columns.

The sensing portions 32a to 32i are implemented as buttons or a touch panel. By operating the buttons or touch panel to activate the sensing portions 32a to 32i, respectively different control signals Sa to Si corresponding to the sensing portions 32a to 32i are issued from the transmission section 38. The control signals are transmitted by using infrared rays, ultrasonic waves, radio waves of various frequency bands, etc., as a carrier.

From the standpoint of the user's convenience, it is preferable that the remote controller 30 and the control device 10 are interconnected wirelessly as mentioned above. However, the remote controller 30 and the control device 10 may be interconnected via wiring.

As will be specifically described below, as the user activates the sensing portions 32a to 32i provided on the remote controller 30, control signals are transmitted from the remote controller 30 to the control device 10. Based on the received control signals, the control device 10 controls the recording section 50. The user is able to control the recording section 50 basically with these nine sensing portions 32a to 32i alone. Therefore, it suffices to place the nine sensing portions 32a to 32i on the remote controller 30. The main body 31 of the remote controller 30 is formed in a size which allows the user to hold it in one hand, and easily operate the sensing portions 32a to 32i with the thumb of his/her holding hand. Moreover, each of the sensing portions 32a to 32i is formed in a size which ensures that, when they are operated with a thumb or the like, any adjoining sensing portion is not operated by mistake. For example, the remote controller 30 shown in FIG. 2 is sized so that one side is 5 cm to 6 cm×12 cm to 15 cm, whereas the size of each of the sensing portions 32a to 32i is about 1.2 cm to 1.5 cm×1.2 cm to 1.5 cm.

The remote controller 30 having the input section 32 so sized is very easy for the user to operate. Moreover, since the sensing portions 32a to 32i are arranged in three rows by three columns, the user is able to operate the sensing portions 32a to 32i in the desired positions without visually confirming the positions of the sensing portions 32a to 32i of the remote controller 30.

The number of sensing portions depends on the number of control states which can be taken by the recording section 50 as the apparatus to be controlled; however, when it is nine, many functions of the recording section 50 can be executed, as will be specifically described below. If the apparatus to be controlled has only a few functions, there may be four sensing portions, for example. Although the remote controller 30 may have ten or more sensing portions, if the number of sensing portions becomes too large, it will become difficult for the user to press an arbitrary sensing portion without confirming the positions of the sensing portions.

Note that, in order to make it easy for the user to recognize the relative positions of the sensing portions 32a to 32i without visually confirming them and operate a desired sensing portion, the surface of the sensing portion 32e, which is positioned in the center among the sensing portions 32a to 32i which are arranged in three rows by three columns, may have a different feel from that of the surface of any other sensing portion. Specifically, a dent 33 shown by a broken line or a bump 33' shown by a solid line may be provided on the surface of the sensing portion 32e. In this case, by touching the dent 33 or the bump 33', the user can recognize that a sensing portion which is provided with them is the central sensing portion 32e just by the feel of it, among the sensing portions which are arranged in three rows by three columns. Therefore, by using the position of the recognized sensing portion 32e as a clue, it is possible to recognize the approximate positions of the other eight sensing portions without looking, so that the sensing portions 32a to 32i can be operated more easily, without visual confirmation (touch system).

Next, the control device 10 will be described. As shown in FIG. 1, the control device 10 includes a reception section 12 and a control section 22. The control section 22 further includes a condition determination section 14, an image generating section 16, and a memory 20. The condition determination section 14 and the image generating section 16 may be composed of a microprocessor 18. The reception section 12 receives the control signals Sa to Si transmitted from the transmission section 38 of the remote controller 30. The control section 22 is in a standby state where the control section 22 is able to receive control signals from the reception section 12, its standby state being updated each time a control signal is received.

The memory 20 of the control section 22 includes an operation state storing section 20a which stores information representing current operation state O1 to On of the disk recorder 102. The current operation state of the disk recorder 102 is determined based on information concerning the operation state of the recording section 50 (as the apparatus to be controlled) in its current standby state, and an operation menu which was generated by the image generating section 16 in an immediately previous standby state. The operation states O1 to On include, for example, a state where a television program is being displayed without performing any recording or playback, a state where a television program is being videorecorded by the disk recorder, a state where a program recorded on the disk recorder or the like is being played back, and so on. Moreover, as shown in Table 1, the memory 20 stores an instruction table which shows correspondence, with respect to various states O1 to On which can be taken by the disk recorder 102, between: groups of instructions G1 to Gn, which are groups of N instructions g1, g2, . . . that can be next commanded by the control section 22 in each state; and the control signals Sa to Si.

TABLE 1

|  | Instruction | | | | |
| --- | --- | --- | --- | --- | --- |
| State | O1 | O2 | O3 | . . . | On |
| Group of Instructions | G1 | G2 | G3 | . . . | Gn |
| Control Signal Sa | g1 | g1 | g16 | . . . | g1 |
| Control Signal Sb | g2 | g10 | g17 | . . . | g2 |
| Control Signal Sc | g3 | g14 | g18 | . . . | g10 |
| Control Signal Sd | g4 | g8 | g21 | . . . | . . . |
| Control Signal Se | g5 | g12 | g19 | . . . | . . . |
| Control Signal Sf | g6 | g14 | g20 | . . . | . . . |
| Control Signal Sg | g7 | g7 | g21 | . . . | . . . |
| Control Signal Sh | g8 | g11 | g21 | . . . | . . . |
| Control Signal Si | g9 | g15 | g21 | . . . | g4 |

When the control device 10 is on standby so as to be able to receive the control signals Sa to Si transmitted from the transmission section 38, the condition determination section 14 acquires from the operation state storing section 20a information as to which operation state the recording section 50 currently has, and acquires from the memory 20 a group of instructions corresponding to the acquired state. In other words, based on the current operation state of the disk recorder 102, the condition determination section 14 assigns to each of the control signals Sa to Si an instruction as to what sort of operation should be performed by the recording section 50 or the control device 10 itself when the reception section 12 receives the control signal Sa to Si.

The image generating section 16 generates a signal for drawing N image regions which are placed in an arrangement corresponding to the sensing portions 32a to 32i on the remote controller 30, and outputs it to the image merging section of the recording section 50. Each of the N image regions expresses information representing an instruction assigned to a control signal which is transmitted when a corresponding one of the sensing portions 32a to 32i is pressed. In other words, the N image regions constitute an operation menu for the disk recorder 102 to be displayed on the screen of the display device 104.

In a standby state of the control device 10, if the reception section 12 receives a control signal Sa to Si, the control section 22 outputs to the recording section 50 an instruction which is assigned to the control signal Sa to Si, and controls the recording section 50 in accordance with the instruction. Moreover, the control section 22 updates the information representing the current operation state O1 to On of the disk recorder 102 as stored in the operation state storing section 20a as mentioned above. As a result, the standby state is also updated.

For example, suppose that the current operation state O1 of the disk recorder 102 is stored in the operation state storing section 20a of the memory 20. The control section 22 acquires the current operation state O1 from the operation state storing section 20a, and acquires from the instruction table shown in Table 1 the group of instructions G1 for the case where the state is O1. In the group of instructions G1, the control signals Sa to Si are mapped to the instructions g1 to g9. In other words, when the current operation state of the recording section 50 is O1, the recording section 50 is able to perform the operations represented by the instructions g1 to g9 from the current state. The instructions g1 to g9 may be operations shown in Table 2, for example.

TABLE 2

Group of Instructions G1

| Instruction | Operation |
|---|---|
| g1 | Clear menu |
| g2 | Display recording menu |
| g3 | Stop recording |
| g4 | Browse programs |
| g5 | Display program table |
| g6 | Show program information |
| g7 | Display menu for program search |
| g8 | Show menu |
| g9 | Display menu for selecting voice/language |

Figure 3:
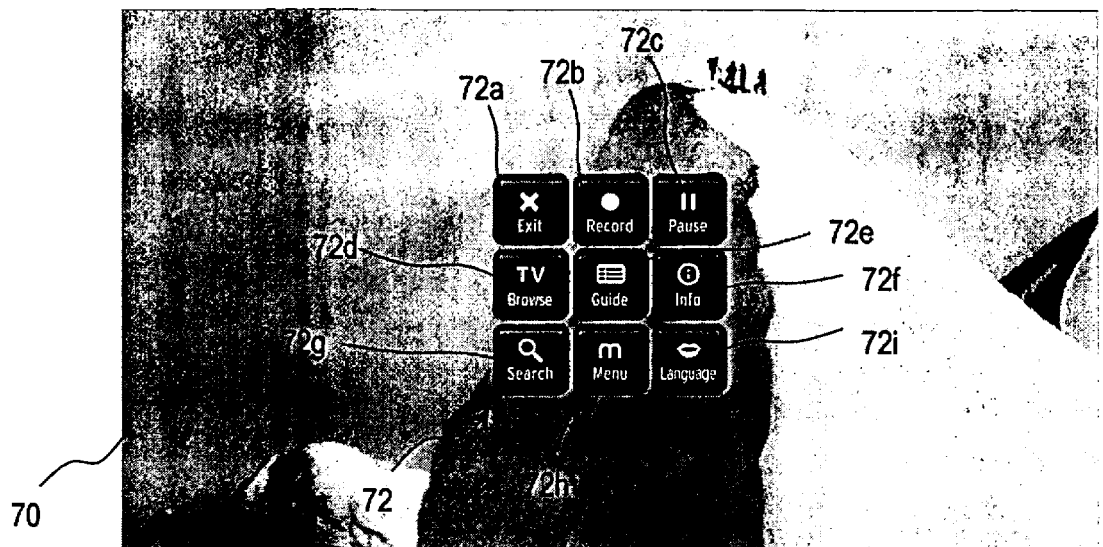
FIG. 3 shows an exemplary screen which is displayed on a display device that is connected to the disk recorder of FIG. 1.

As shown in FIG. 3, the image generating section 16 generates an image 72 including image regions 72a to 72i that contain information representing the operations of the instructions g1 to g9, and overlays the image 72 on the image 70 selected by the image merging section 62. The information representing the instructions g1 to g9 may be text, icons such as diagrams, or combinations thereof. In the image 70, the image regions 72a to 72i are placed in an arrangement corresponding to the sensing portions 32a to 32i of the remote controller 30. In other words, the image regions 72a to 72i are arranged in three rows by three columns. Moreover, as shown in Table 1, the instructions g1 to g9 of the group of instructions G1 correspond to the control signals Sa to Si; therefore, the image regions 72a to 72i are placed in an arrangement corresponding to the sensing portions 32a to 32i which issue the control signals Sa to Si.

FIG. 3 shows a state in which a television program is being displayed, without performing recording or play back, for example. By seeing the image shown in FIG. 3, the user will know which one of the sensing portions 32a to 32i should be pressed to cause the disk recorder 102 to perform a desired operation. For example, if the user presses the sensing portion 32f on the remote controller 30 (which corresponds to the image region 72f) in order to obtain detailed information of the currently displayed television broadcast, the transmission section 38 outputs the control signal Sf.

When the control signal Sf is received at the reception section 12, the control section 22 of the control device 10 outputs to the recording section 50 the instruction g6, which is associated with the control signal Sf as defined in the group of instructions G1, and controls the recording section 50 in accordance with the instruction.

As the recording section 50 is controlled in accordance with the instruction, the current operation state of the disk recorder 102 changes. Therefore, the operation state storing section 20a updates the information representing the state of the disk recorder 102. Moreover, based on the updated state, the condition determination section 14 selects a new group of instructions from the instruction table. Based on the updated group of instructions, the image generating section 16 generates a signal for a new image representing an operable group of instructions, and outputs it to the image merging section 62. As a result, the control device 10 enters a standby state where a next operation from the user by means of the remote controller 30 is awaited.

The instructions to be included in the instruction table include: instructions for directly controlling the disk recorder 102; instructions for assigning next instructions to control signals in a next standby state, and causing the image generating section to generate a signal for displaying a next operation menu; and instructions for executing both. A next operation menu would include control instructions for selecting more detailed operation conditions or the like for a function related to the disk recorder 102 that has been selected in an immediately previous operation menu. In other words, the plurality of operation menus to be displayed by the control device 10 have a hierarchical structure.

Figure 4:
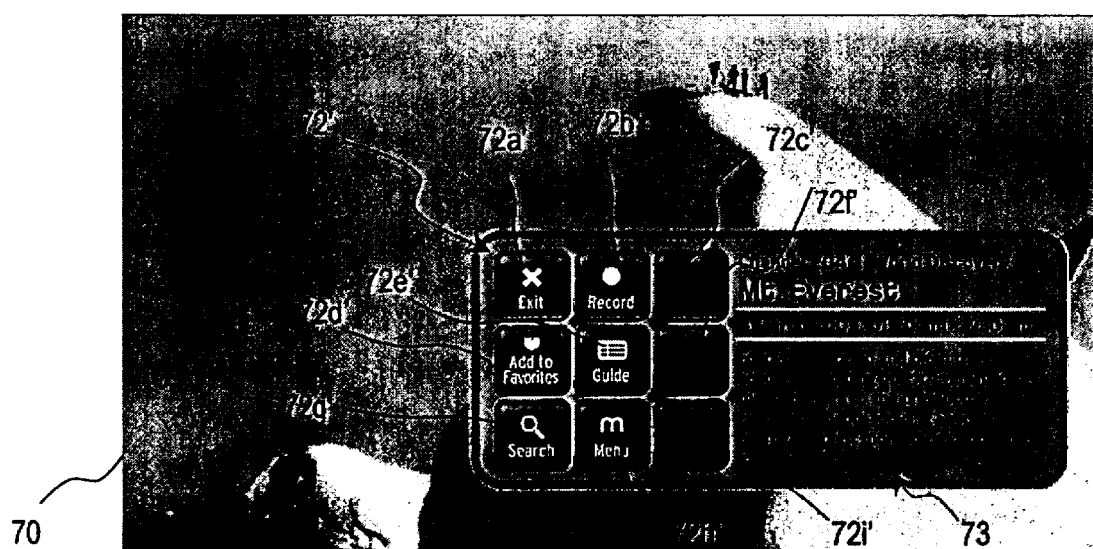
FIG. 4 shows another exemplary screen which is displayed on a display device that is connected to the disk recorder of FIG. 1.

For example, if the sensing portion 32f on the remote controller 30 corresponding to the image region 72f is pressed in FIG. 3 in order to obtain detailed information of the television broadcast as described above, an image 72' representing a group of instructions which is operable in the next standby state is displayed, as shown in FIG. 4. At the same time, based on the instruction g6, detailed information 73 of the television broadcast which is the image 70 is also displayed. Thus, in addition to the image 72' representing a group of instructions, the operation menu may include information other than instructions concerning the apparatus to be controlled.

On the other hand, supposing that FIG. 3 indicates a state where a television program is being displayed while the program is recorded to the disk drive 52, if the sensing portion 32c on the remote controller 30 corresponding to the image region 72c is pressed, then the control section 22 will pause the recording operation of the disk drive 52. This amounts to an instruction of directly controlling the disk recorder 102.

Thus, if a sensing portion 32a to 32i on the remote controller 30 is once operated, an instruction indicated in the corresponding image region is directly executed. Since this does not involve a two-step operation of selecting an instruction and then executing the selected instruction, it is possible to execute a desired instruction even in the case where the operation menu is displayed in a hierarchical manner.

As shown in FIG. 3 and FIG. 4, in either of the operation menu 72 shown in FIG. 3 and the operation menu 72' to be next displayed, image regions corresponding to the sensing portions on the remote controller 30 are placed. Therefore, simply by looking at the screen of the display device 104, the user is able to easily recognize an instruction which will be executed when a sensing portion on the remote controller 30 is pressed.

Figure 24:
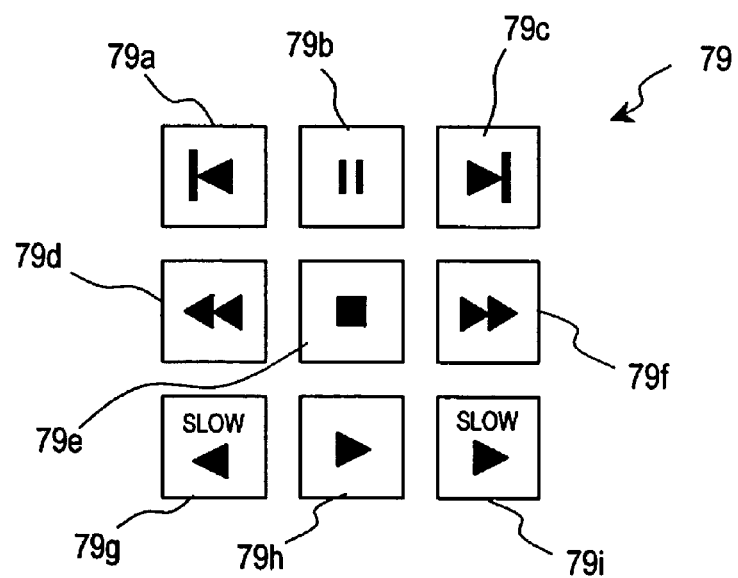
FIG. 24 shows another exemplary screen which is displayed on a display device that is connected to the disk recorder of FIG. 1.
Figure 25:
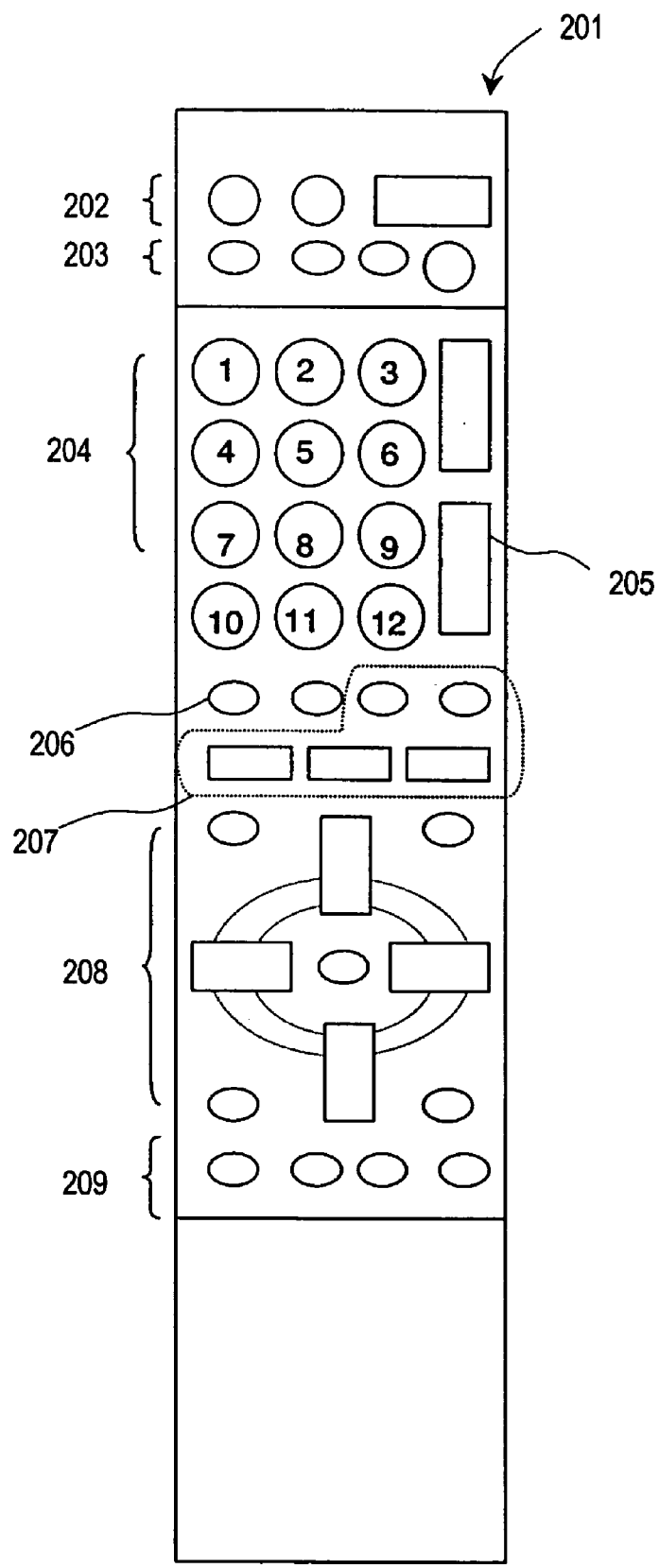
FIG. 25 is a plan view showing an example of a remote controller for controlling a conventional AV apparatus.

As has been described with reference to Table 1, based on the operation states O1 to On, the control device 10 determines a group of instructions G1 to Gn, which can be next commanded, to be assigned to the control signals. Therefore, images representing instructions which can be next commanded, as determined based on the current operation state O1 to On of the disk recorder, may also be included in the operation menu. For example, in the case where the disk recorder 102 is playing back a television program which is recorded in the disk drive 52, based on this operation state, the control device 10 may assign a group of instructions concerning play back to the control signals. Specifically, an operation menu 79 as shown in FIG. 24 may be displayed. As shown in FIG. 24, image regions 79a to 79i included in the operation menu 79 represent the instructions of: chapter skip in the forward and backward directions; fast-forward; rewind; slow play back in the forward and backward directions; pause; and stop. These instructions are assigned to the control signals Sa to Si which will be transmitted when the sensing portions 31a to 31i corresponding to the image regions 79a to 79i are operated. Therefore, while looking at the operation menu 79, the user is able to readily stop the play back screen, or perform fast-forwarding.

Thus, with the control device 10, the operation menu to be displayed changes in accordance with the operation states O1 to On, so that an operation menu which can be commanded is displayed on the screen in accordance with the current operation state of the disk recorder. Therefore, the user does not need to always go down a hierarchical menu in order to change the operation state of the disk recorder, and thus the number of sensing portions to be pressed in order to perform a desired operation can be small. Thus, control with good operability is realized.

Moreover, since a group of instructions G1 to Gn which can be next commanded is determined based on the operation states O1 to On, even if the apparatuses to be controlled by the control device 10 increase in number or types, the instructions which are executable in the operation states O1 to On of such apparatuses are determined by the control device 10 in advance. Therefore, without being conscious of the number or types of apparatuses, the user can perform desired control by operating the remote controller 30 in accordance with the operation menus.

Note that, in the case where the operation menu 72 shown in FIG. 3 is displayed, if any instruction that is indicated in the operation menu 72 is impossible to be executed depending on the state of the disk recorder 102, any image region 72a to 72i which represents such an inoperable instruction may be displayed in an obscure color, and, even if a sensing portion corresponding to that image region is operated and a control signal is received by the control device 10, the corresponding instruction may be withheld from being executed. For example, in the case where no recording region for performing new recording is left in the disk drive 52, the image region 72b may be shown in gray, and it may be ensured that no instruction is executed even if the sensing portion 32b is operated.

Moreover, it would be preferable that colors of the image regions differ between the operation menu 72 and the operation menu 72' which is next displayed. As a result, even if the operation menus do not differ in their outer shape, the user can easily recognize when a different operation menu has been displayed, based on the differences in color.

Moreover, when identical or similar instructions are included in different operation menus, it would be preferable that the image regions representing such instructions are placed in the same position on each operation menu. This enables the user to memorize the position of any image region representing an identical or similar instruction by experience, so that the user can give a desired instruction, without meticulously examining each operation menu displayed on the screen, by using the remote controller 30. For example, by ensuring that any instruction for ending an operation menu will be placed at the leftmost column in the uppermost row, it becomes easy for the user to end the menu, regardless of what sort of operation menu is being displayed.

In order to thus ensure that a specific instruction will be displayed at a specific position in the operation menu, an identical or similar instruction needs to be assigned to a specific control signal in the instruction table shown in Table 1. For example, the image region which is placed at the leftmost column in the uppermost row corresponds to the sensing portion 32a on the remote controller 30, and the sensing portion 32a causes the control signal Sa to be transmitted from the transmission section 38. Accordingly, any instruction to end a menu may be mapped to the control signal Sa, regardless of the operation state of the recording section 50.

As shown in FIG. 4, no instructions are indicated in the image regions 72c', 72f' and 72i'. When a sensing portion corresponding to such an image region in which no instruction is indicated is pressed, the control section 22 does not issue any instruction to the recording section 50, but maintains the same state. Alternatively, the control section 22 may issue an instruction to control the recording section 50 so as to maintain the current operation state. Thus, by showing the image region even if no instruction corresponds thereto or an instruction for maintaining the current operation state is assigned to the sensing portion, it becomes easy to recognize the sensing portion having no instruction assigned thereto. For even easier recognition, the image regions 72c', 72f' and 72i', to which no instruction corresponds or an instruction for maintaining the current operation state is assigned to the sensing portions, may be displayed in a different color from that of the image regions in which instructions are indicated.

Figure 5:
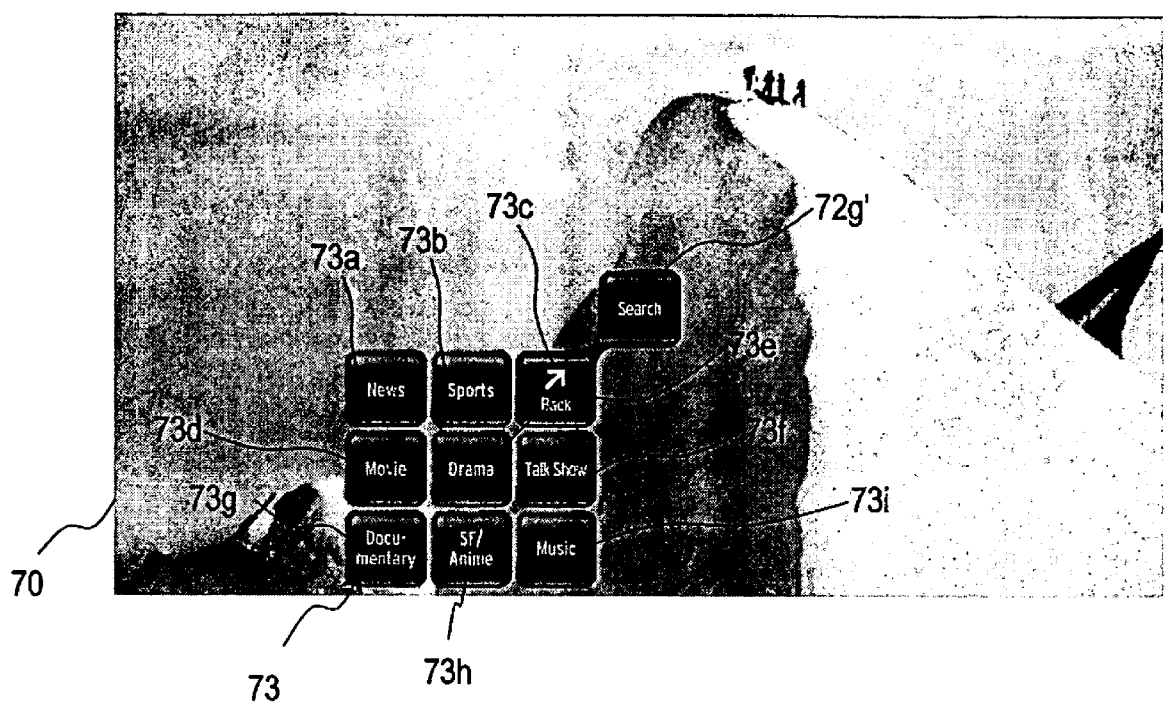
FIG. 5 shows another exemplary screen which is displayed on a display device that is connected to the disk recorder of FIG. 1.

FIG. 5 shows an operation menu 73 which, under a standby state where an image as shown FIG. 3 is displayed, is next displayed when the sensing portion 32g on the remote controller 30 is pressed in order to cause the recording section 50 to perform a search. As shown in FIG. 5, not only image regions 73a to 73i corresponding to the sensing portions are displayed, but an image region 72g, which corresponds to the sensing portion 32g that was pressed in the immediately previous operation menu 72 in order to display the operation menu 73, is also indicated. Among the image regions 73a to 73i, an instruction to return to the previous display menu (Back) is assigned. The image region 73c and the image region 72g are shown connected, and are shown in the color that was used in the immediately previous operation menu 72. By employing such an operation menu, it becomes easy for the user to understand how the operation menu 72 relates to the immediately previous operation menu. Moreover, by placing the operation menu 73 at a different position (on the screen of the display device 104) from that of the immediately previously displayed operation menu 72, it becomes easy to recognize that a menu pertaining to a different hierarchical level is being displayed, even if an operation menu having the same outer shape is displayed.

Figure 6:
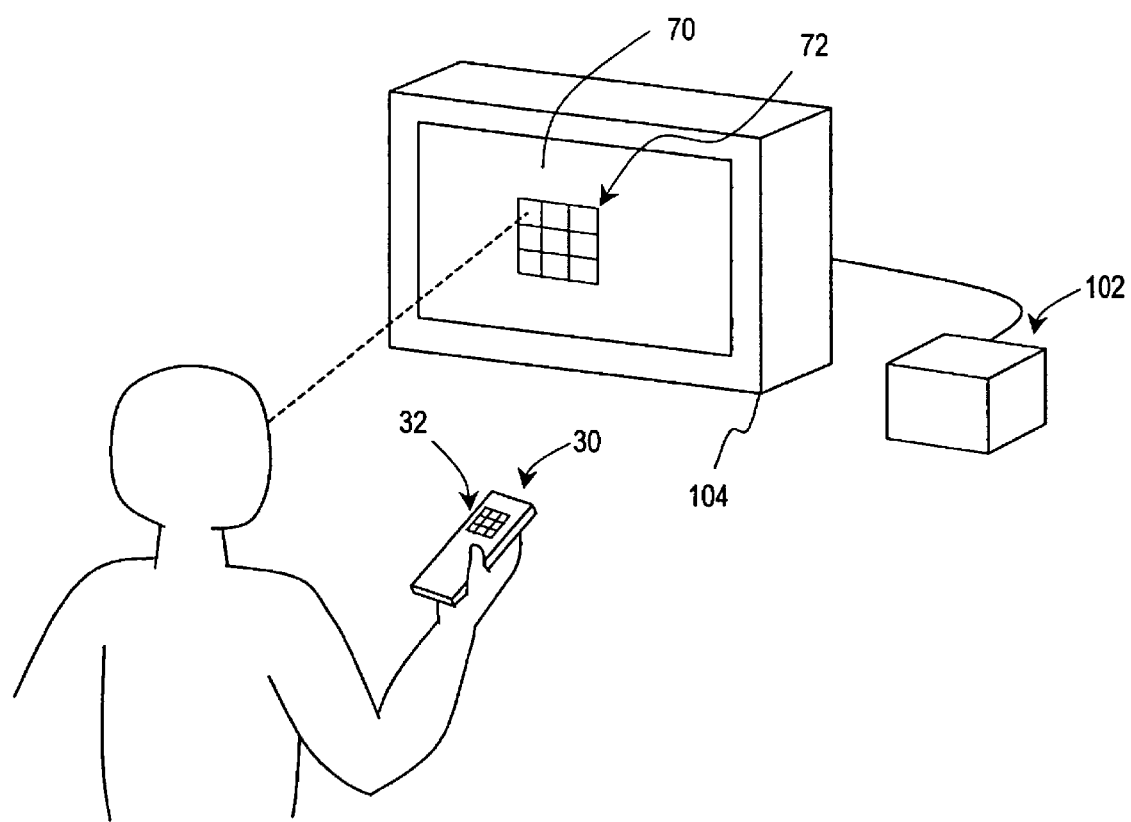
FIG. 6 is a diagram schematically showing a manner in which a user operates the disk recorder of FIG. 1.

FIG. 6 is a schematic diagram showing a manner in which the user operates the disk recorder 102 of the present embodiment. As shown in FIG. 6, the image 70 and the operation menu 72 shown in FIG. 3 are indicated on the screen of the display device 104. As described above, functions which will be operable when the user presses on the input section 32 of the remote controller 30 are indicated in the operation menu 72. Since the function to be executed when each sensing portion in the input section 32 is pressed is indicated on the screen of the display device 104, rather than on the remote controller 30, the user only needs to look at the screen to know what the operable functions are. Moreover, as described above, since the respective sensing portions of the input section 32 provided on the remote controller 30 are arranged in three rows by three columns in the present embodiment, the user can press any arbitrary sensing portion without looking at the remote controller 30 to confirm the position of the sensing portion. Therefore, the user can operate the disk recorder 102 by using the remote controller 30 while looking only at the screen of the display device 104.

Under the control by the conventional remote controller shown in FIG. 24, where specific functions are imparted to the buttons provided on the remote controller, it has been necessary to determine which button on the remote controller should be pressed, by relying on the information that is displayed on the television screen. In other words, it has been necessary to look at both the television screen and the remote controller. Therefore, it has been necessary for the user to perform operation while shifting his/her line of sight. According to the present embodiment, such cumbersomeness is eliminated, and excellent operability is provided.

The inventors of the present invention have asked six testees, whose ages were between 30 to 60, to operate the disk recorder 102 of the present embodiment, thus examining its operability. As a result, 100% of the testees were able to properly operate the disk recorder 102 with no explanation of any specific method to use the remote controller of the present embodiment. Moreover, 83% of the testees responded that it is easier to operate and easier to use than conventional remote controllers.

Figure 7:
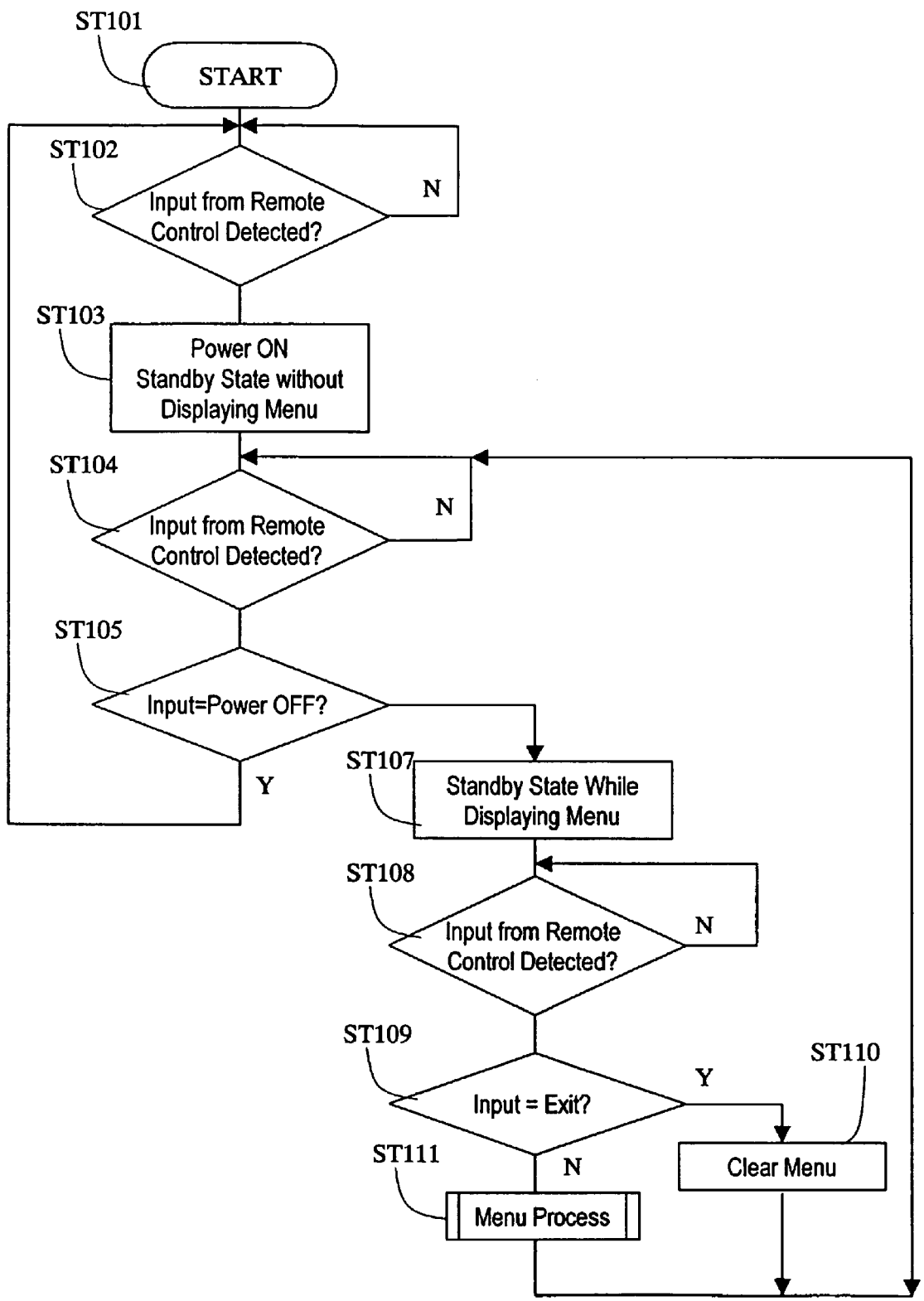
FIG. 7 is a flowchart describing operations of the control device shown in FIG. 1.

Next, with reference to FIG. 1 and flowcharts, the operation of the disk recorder 102 will be described. FIG. 7 is a flowchart describing the operation since the disk recorder 102 is booted until it is stopped.

In the present embodiment, a control signal Sa to Si which is transmitted by pressing one of the sensing portions 32a to 32i on the remote controller 30 is used in order to boot or stop the disk recorder 102. However, a power button for booting or stopping the disk recorder 102 may be provided on the remote controller 30, other than the sensing portions 32a to 32i.

Firstly, the flowchart begins at step ST101. As shown in step ST102, when the disk recorder 102 is in a stop state, the control device 10 determines whether any control signal is received from the remote controller 30 or not. Even while the disk recorder 102 is in a stop state, the control device 10 is always in a standby state, and is able to detect control signals. For example, at this time, information indicating that the disk recorder 102 is in a stop state may be stored in the operation state storing section 20a of the memory 20, and based on the information indicating the state of the disk recorder 102 that is stored in the memory, the control section 22 may map an instruction for booting the disk recorder 102 to all of the control signals Sa to Si.

When any of the control signals Sa to Si is received as a result of any of the sensing portions 32a to 32i of the remote controller 30 being operated, the power of the disk recorder 102 is turned on, as shown in step ST103. Then, the disk recorder 102 enters a standby state for accepting an instruction from the user (steps ST103, ST104).

Figure 8:
FIG. 8 shows an exemplary screen which is displayed on a display device that is connected to the disk recorder during the operations described in FIG. 7.

When the disk recorder 102 has just booted through the aforementioned procedure, no image is displayed on the display device 104. This state of step ST103 also exists when the below-described instructions have been executed for the disk recorder 102. The state of the disk recorder 100 at this time is defined as Oi. In this case, an image of a television broadcast which is input via the set-top box 108 is displayed on the display device 104, as shown in e.g. FIG. 8. However, in this case, no operation menu is displayed on the display device 104.

At this time, information indicating the standby state of step ST103 is stored to the operation state storing section 20a. In the control section 22, with respect to any of the control signals Sa to Si, the current operation state is maintained for the recording section 50 (or no new instruction is issued), and an instruction for updating the instructions to be assigned to the control signals is mapped, based on the information stored in the operation state storing section 20a.

In the standby state, when the control device 10 has received any of the control signals Sa to Si from the remote controller 30, it is determined whether the signal is an instruction for placing the disk recorder 102 in an OFF state or not (step ST105). For example, in the case where any of the sensing portions 32a to 32i on the remote controller 30 is pressed longer than a predetermined period of time so that the control signal Sa to Si is output longer than the predetermined period of time, or repeatedly output a predetermined number of times or more, it is determined to be an instruction for powering OFF the disk recorder 102, and the disk recorder 102 is powered OFF. As a result, the disk recorder 102 enters a stop state.

Figure 9:
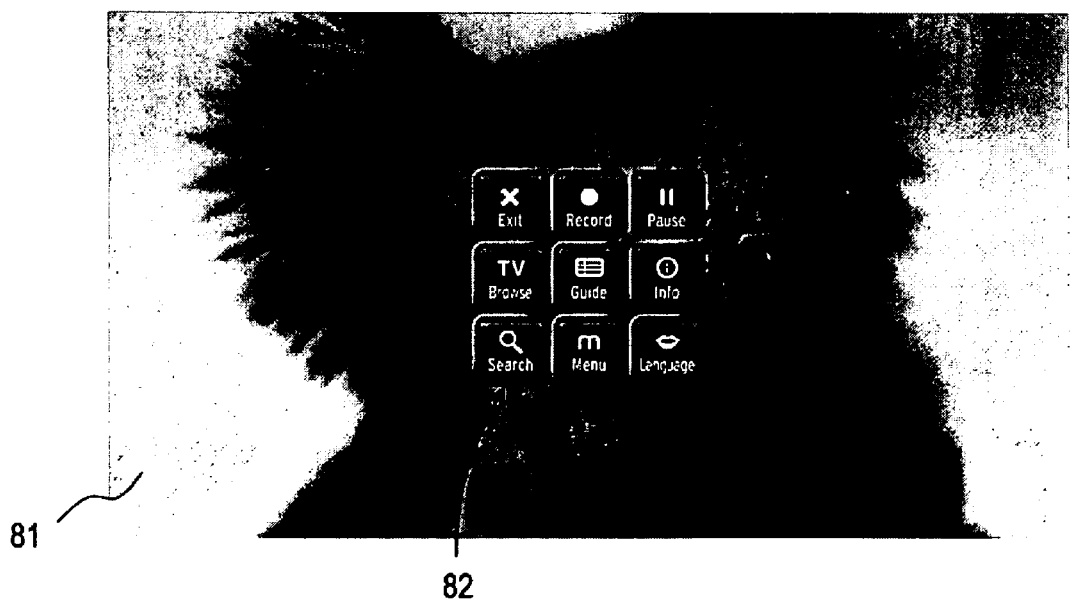
FIG. 9 another exemplary screen which is displayed on a display device that is connected to the disk recorder during the operations described in FIG. 7

In the standby state, if any control signal received from the remote controller 30 has been output shorter than the predetermined period of time, or less than the predetermined number of times, the control device 10 determines that a next control instruction for the disk recorder 102 has been received. Then, the control device 10 updates the information indicating the current operation state of the memory 22 to information O1, and based on the updated current operation state, selects the group of instructions G1, in which the instructions and control signals are mapped as shown in Table 2. Moreover, it causes the image generating section 16 to generate an image which is based on the mapping between the instructions and control signals shown in Table 2 (step ST107). As a result, as shown in FIG. 9, an image in which an operation main menu 82 is overlaid on a screen 81 is displayed on the display device 104.

In the standby state where the operation main menu 82 is displayed, the disk recorder 102 stands by while repeating step ST108 until any of the control signals is received from the remote controller 30.

If the sensing portion 32a corresponding to a display clear instruction that is displayed on the screen of the display device 104 is pressed so that the control device 10 receives the control signal Sa from the remote controller 30 (step ST109), the control section 22 executes an instruction of clearing the menu, which is associated with the control signal Sa in the group of instructions G1 (step ST110). As a result, the operation main menu is cleared from the image on the display device 104, thus entering a standby state where no operation menu is displayed (step ST104).

On the other hand, at step ST109, if any of the sensing portions 32b to 32i that corresponds to an image region representing an instruction other than the display clear instruction is pressed so that the control device 10 receives any of the control signals Sb to Si from the remote controller 30, the control section 22 performs a menu process for executing each instruction (step ST111).

Figure 10:
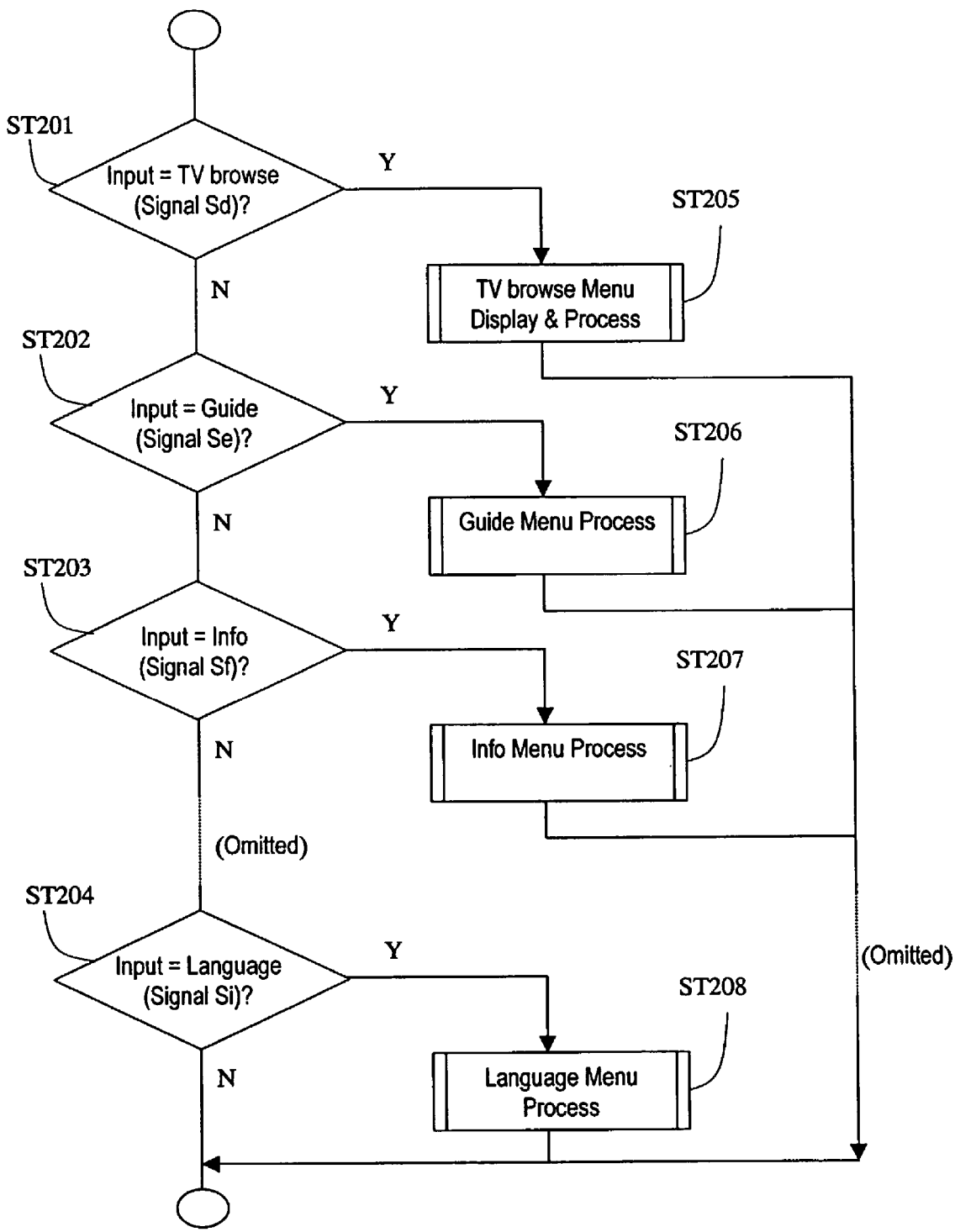
FIG. 10 is a flowchart for specifically describing one of the operations described in FIG. 7.
Figure 11:
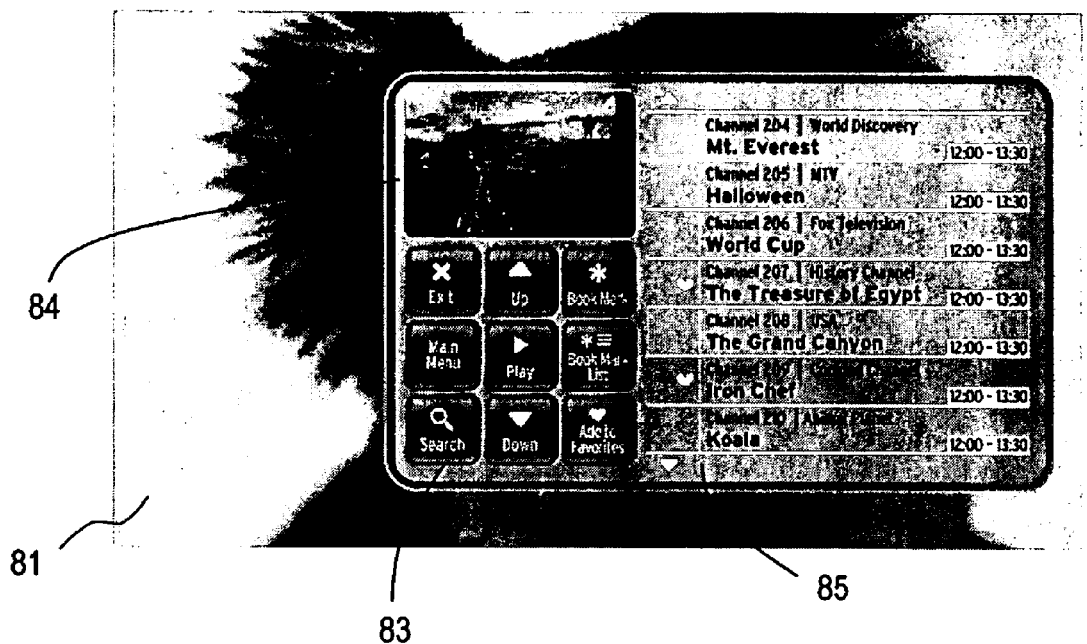
FIG. 11 shows an exemplary screen which is displayed on a display device that is connected to the disk recorder during the operations described in FIG. 10.

FIG. 10 is a flowchart for processing the menus shown in the operation main menu 82 of FIG. 9. FIG. 10 shows only some of the instructions shown in the operation main menu 82. As shown in FIG. 10, if the control device 104 has received the control signal Sd (step ST201), the control device 10 updates the state (as stored in the memory) indicating the current operation state of the disk recorder 102 to information O2, and selects the group of instructions G2, in which the instructions and control signals are mapped as shown in Table 3. Moreover, it causes the image generating section 16 to generate an image which is based on the mapping between the instructions and control signals shown in Table 3. As a result, as shown in FIG. 11, an image in which a TV browsing menu 83 (which is an operation menu at the next hierarchical level) is overlaid on the screen 81 is displayed on the display device 104 (step ST205). Moreover, as shown in FIG. 11, an image 84 from the selected channel and a program table 85 are also displayed on the display device 104.

TABLE 3

Group of Instructions G2

| Instruction | Operation |
|---|---|
| g1 | Clear menu |
| g7 | Display menu for program search |
| g8 | Display main menu |
| g10 | Move cursor one up |
| g11 | Move cursor one down |
| g12 | Display selected program |
| g13 | Bookmark selected program |
| g14 | Display list of those bookmarked |
| g15 | Add to favorites |

If the control device 10 receives the control signals Sa to Si transmitted from the remote controller 30 in this state, the instructions as defined in the group of instructions G2 shown in Table 1 and Table 3 are mapped thereto. Therefore, if the user presses the sensing portion 32b, for example, the control signal Sb is transmitted, and based on the relationship defined in the group of instructions G2 of Table 1, the control section 22 having received the control signal Sb determines that the instruction g10 of "Move cursor one up" has been received. Then, the control section 22 moves the cursor shown in the program table 85 one up, and maintains same state by determining that the state O2 of the disk recorder 102 has been conserved. On the other hand, if the user presses the sensing portion 32e, for example, the control signal Se is transmitted, and the control section 22 having received the control signal Se determines that the instruction g12 of "Display selected program" has been received, based on the relationship defined in the group of instructions G2 of Table 1. Then, instead of the screen 81, the control section 22 displays the program which is shown on the screen 84 over the entire display device 104, and clears the TV browsing menu 83, the image 84, and the program table 85. Thereafter, in the control section 22, the current operation state of the disk recorder 102 shifts to "O1", and information representing the current operation state is stored to the memory 22.

As shown in FIG. 10, if the control signal Se is received instead of the control signal Sd, control proceeds from step ST202 to step ST206 of displaying a guide menu, and a guide menu process is executed. If the control signal Sf is received, control proceeds from step ST203 to step ST207 of displaying program information, and a program information display menu process is executed.

Figure 12:
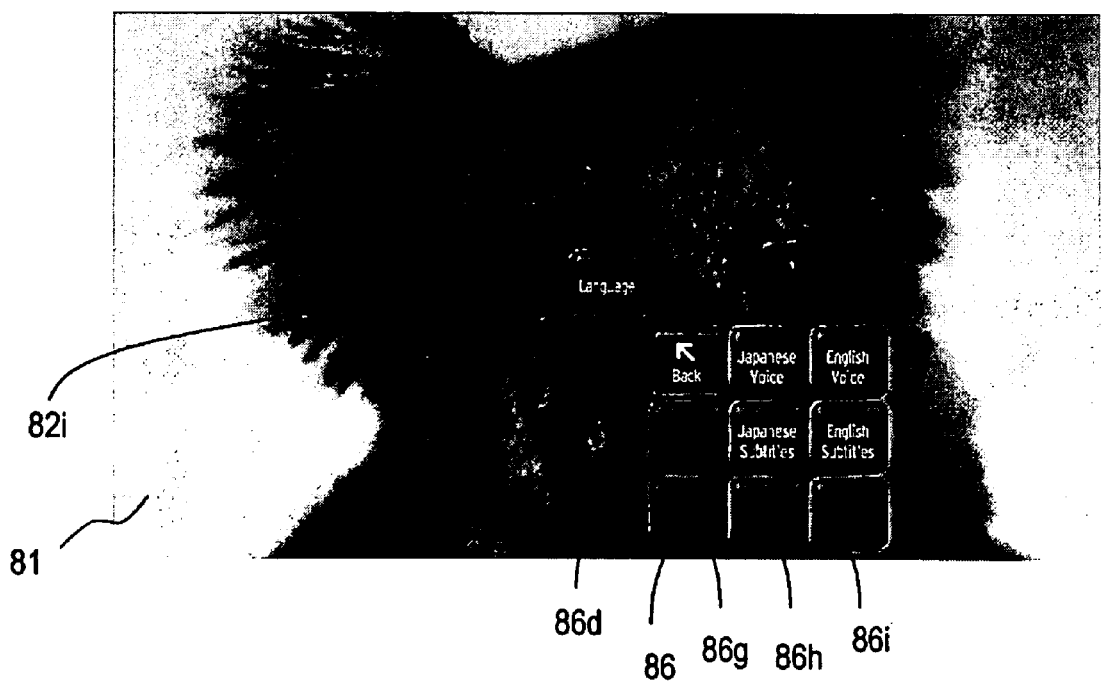
FIG. 12 shows an exemplary screen which is displayed on a display device that is connected to the disk recorder during the operations described in FIG. 10.

As shown in FIG. 10, if the control device 104 has received the control signal Si (step ST204), the control device 104 updates the information (as stored in the memory) representing the current operation state of the disk recorder 102 to information O3, and selects the group of instructions G3, in which the instructions and control signals are mapped as shown in Table 4. Moreover, it causes the image generating section 16 to generate an image which is based on the mapping between the instructions and control signals shown in Table 4. As a result, as shown in FIG. 12, an image in which a language menu 86 (which is an operation menu at the next hierarchical level) is overlaid on the screen 81 is displayed on the display device 104 (step ST208).

As shown in Table 1 and Table 4, in the group of instructions G3, an instruction g21 to maintain the current control state is assigned to the control signals Sd and Sg to Si. In other words, the state of the disk recorder 102 does not change even if the control device 10 receives these control signals. There-fore, in the language menu 86, no information indicating an instruction is displayed in the image regions 86d and 86g to 86i.

TABLE 4

Group of Instructions G3

| Instruction | Operation |
|---|---|
| g16 | Go back to previous menu |
| g17 | Select Japanese voice |
| g18 | Select English voice |
| g19 | Display Japanese subtitles |
| g20 | Display English subtitles |
| g21 | Maintain current control state |

Figure 13:
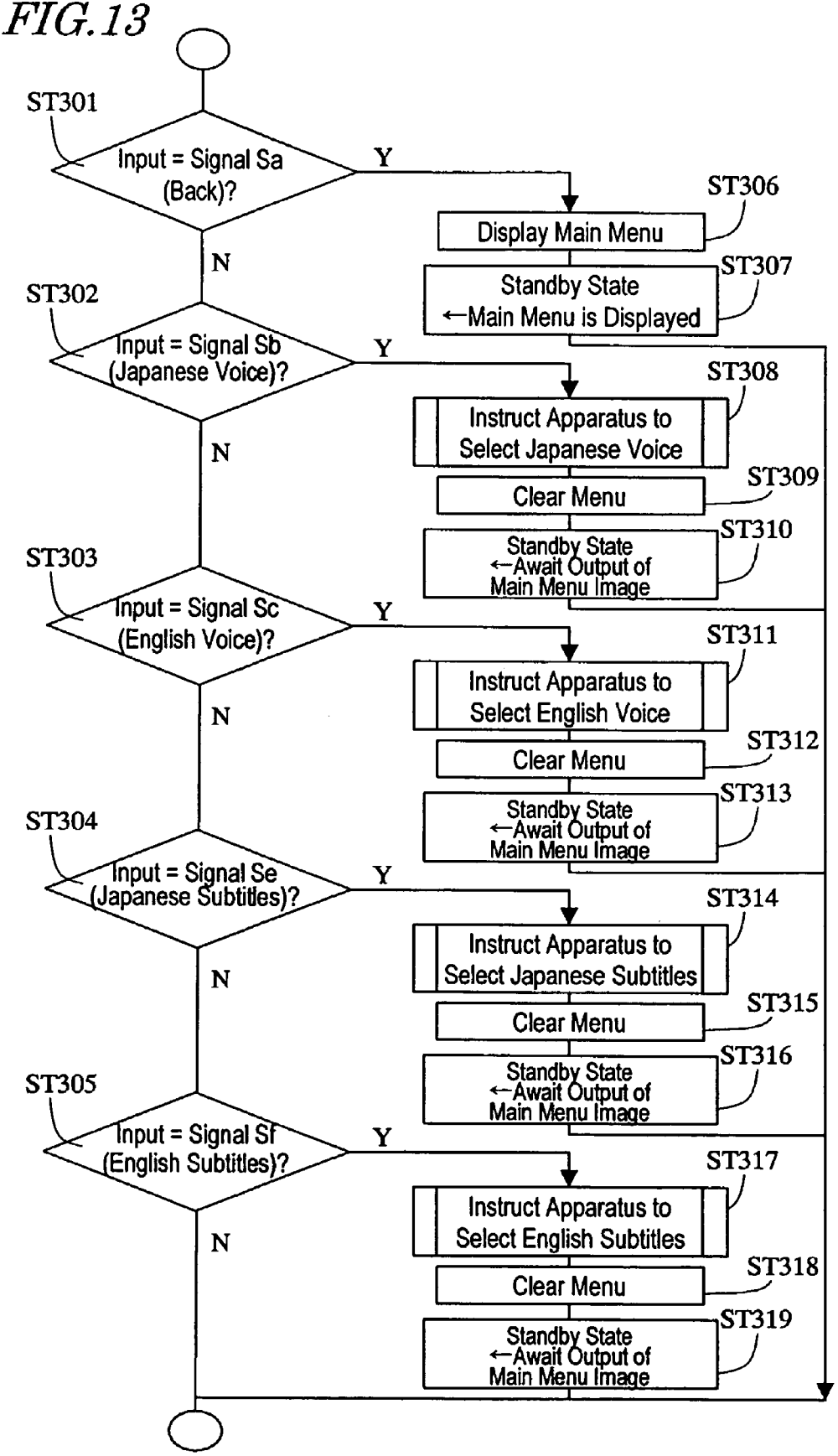
FIG. 13 is a flowchart for specifically describing one of the operations described in FIG. 10.

If the control device 104 receives the control signals Sa to Si transmitted from the remote controller 30 in this state, the instructions as defined in the group of instructions G3 shown in Table 1 and Table 4 are mapped thereto. A procedure of executing the instructions at this time is shown in FIG. 13. For example, if the user presses the sensing portion 32a, the control signal Sa is transmitted, and based on the relationship defined in the group of instructions G3 of Table 1, the control section 22 having received the control signal Sa determines that the instruction g16 of "Go back to previous menu" has been received.

At this time, the control device 10 updates the information in the memory 22 indicating the state of the disk recorder 102 to "O1", and the control section 22 selects the group of instructions G1 corresponding to the state O1. As a result, the image generating section 16 generates an image of the operation main menu 82 as shown in FIG. 9, and an image in which the operation main menu 82 is overlaid on the image 81 shown in FIG. 9 is displayed (step ST306). Moreover, the disk recorder 102 stands by for a next control signal while displaying the main menu (step ST307).

On the other hand, if the user presses the sensing portion 32b, the control signal Sb is transmitted, and based on the relationship defined in the group of instructions G3 of Table 1, the control section 22 having received the control signal Sb determines that the instruction g17 of "Select Japanese voice" has been received. The control section 22 controls the recording section 50 so as to select Japanese voice. Then, the information indicating the state O1 of the disk recorder 102 is stored to the operation state storing section 20a. Based on the state stored in the operation state storing section 20a, the control section 22 clears the menu, and then enters a standby state (steps ST309, 310).

Similar procedures are repeated for the case of selecting English voice (steps ST303, 311, 312, 313), for the case of selecting Japanese subtitles (steps ST304, 314, 315, 316), and for the case of selecting English subtitles (steps ST305, 317, 318, 319).

Figure 14:
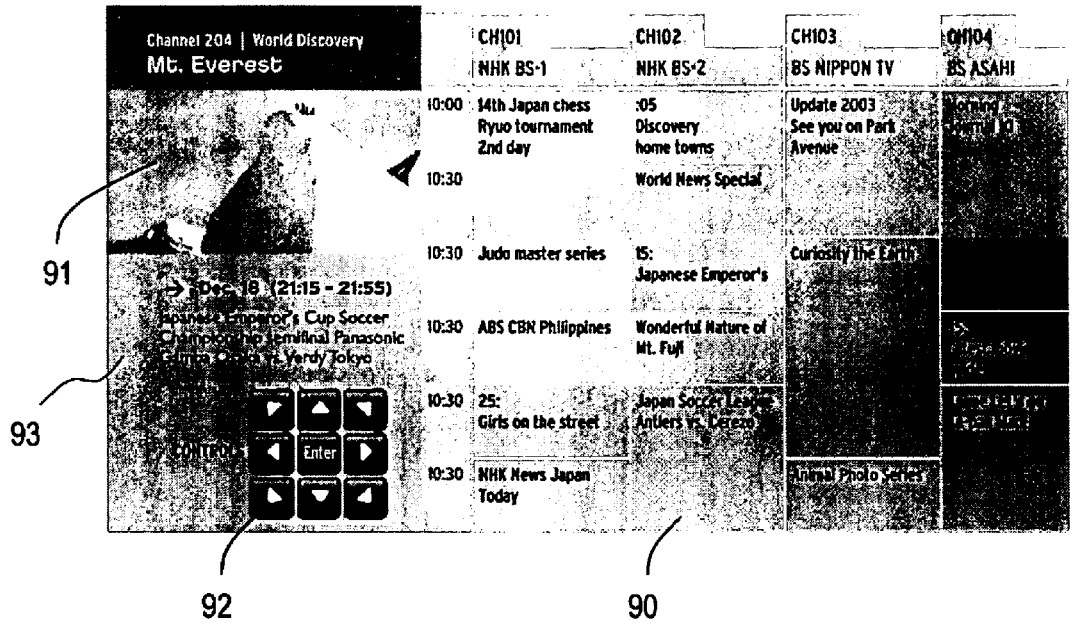
FIG. 14 shows another exemplary screen which is displayed on a display device that is connected to the disk recorder during the operations described in FIG. 7.
Figure 15:
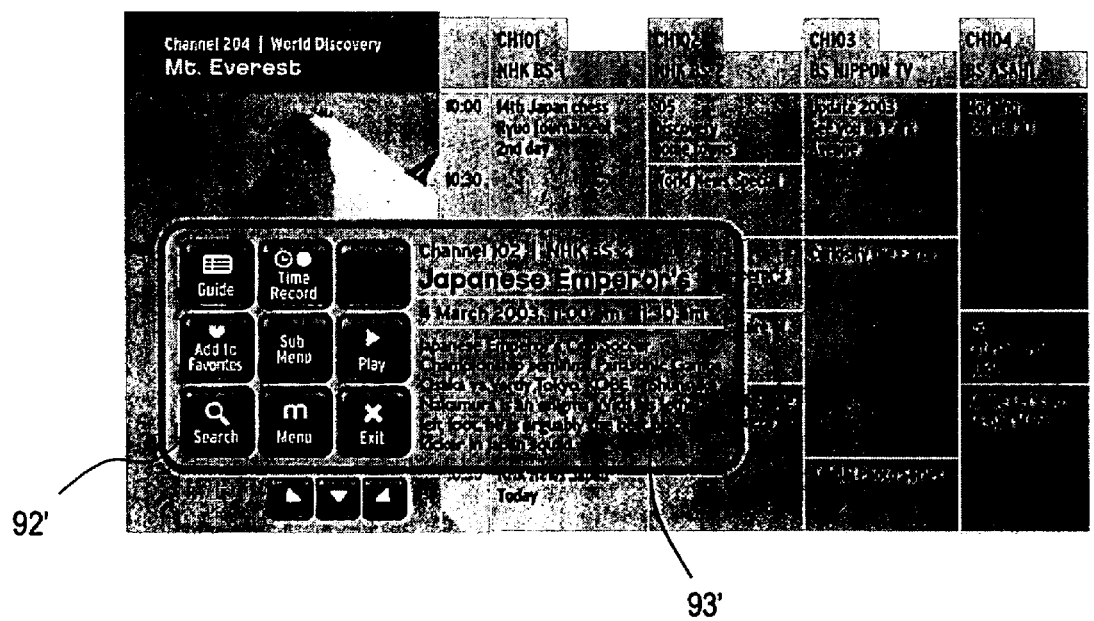
FIG. 15 shows another exemplary screen which is displayed on a display device that is connected to the disk recorder during the operations described in FIG. 7.

Hereinafter, other examples of operation menus which are displayed on the display device 104 by operating the remote controller 30 will be illustrated. FIG. 14 shows an image which is displayed when the sensing portion 32e is pressed in a state where the operation main menu 82 shown in FIG. 9 is being displayed. As shown in Table 1 and Table 2, if the control signal Se is transmitted by pressing the sensing portion 32e, the control section 20 controls the recording section 50 so as to execute the instruction g5 of displaying a program table in response to the control signal Se. As a result, as shown in FIG. 14, a program table 90, an introductory image 91 which is embedded in a program selected from within the program table 90, a brief explanation 93 of the selected program, and a menu 92, which is an image showing instructions which will be executed when the sensing portions 32 are pressed, are displayed. Having seen the menu 92, the user will move the cursor by using the input section 32, and by pressing the sensing portion 32e shown as "Enter", causes a more detailed explanation 93' and a new menu 92', which can be executed with respect to the selected program, (shown in FIG. 15) to be displayed. By using the menu 92', the user is able to execute videorecording scheduling of the selected program, for example.

Figure 16:
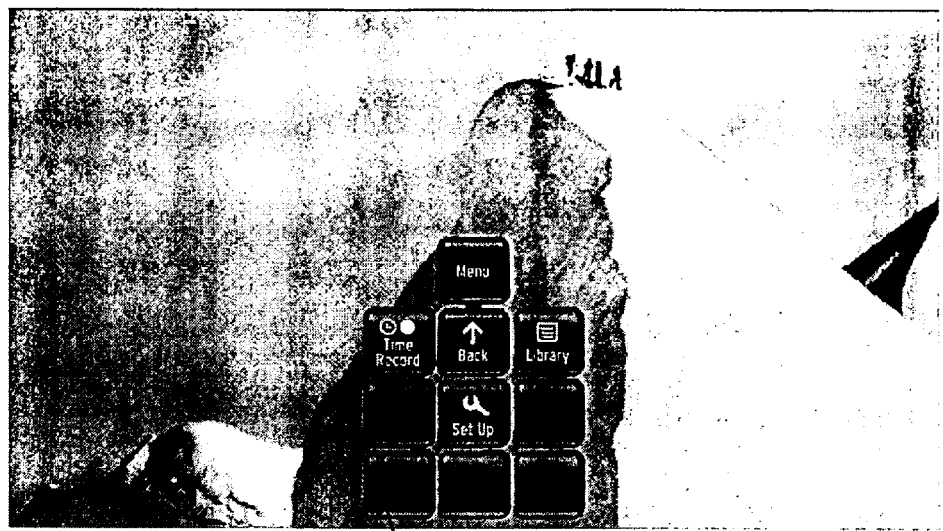
FIG. 16 shows another exemplary screen which is displayed on a display device that is connected to the disk recorder during the operations described in FIG. 7.

FIG. 16 shows an image which is displayed when the sensing portion 32h is pressed in a state where the operation main menu 82 shown in FIG. 9 is being displayed. As shown in Table 1 and Table 2, if the control signal Sh is transmitted by pressing the sensing portion 32h, the control section 20 controls the recording section 50 so as to execute the instruction g8 of displaying a menu in response to the control signal Sh. As a result, as shown in FIG. 16, a menu 94 is displayed. In the menu 94, videorecording scheduling of the program, operation setting of the disk recorder 102, and listing of the information recorded in the recording section 50 (Library) can be executed.

Figure 17:
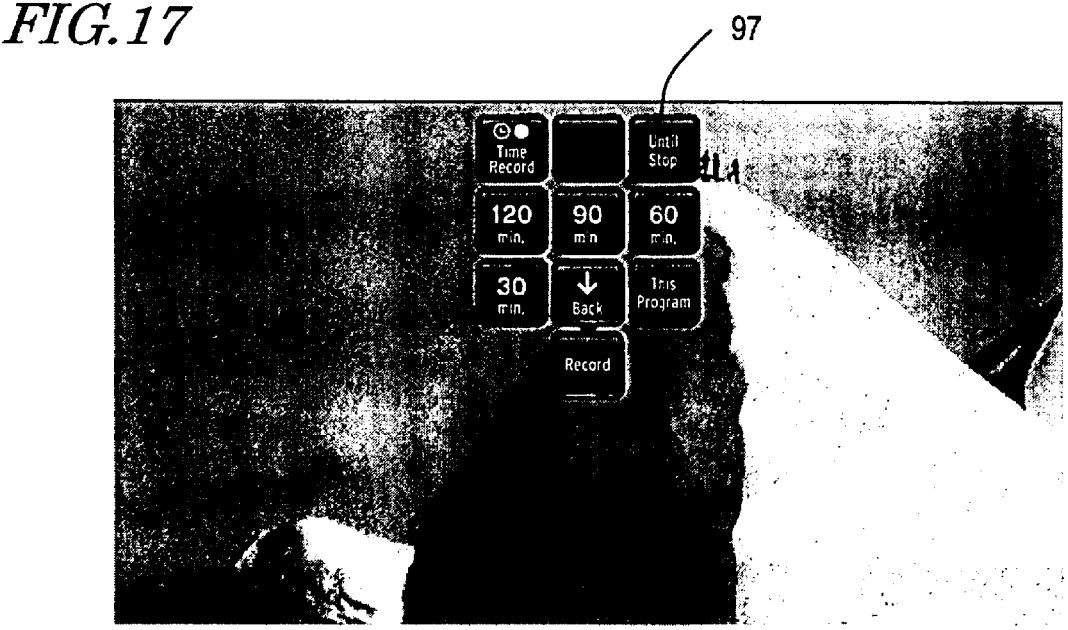
FIG. 17 shows another exemplary screen which is displayed on a display device that is connected to the disk recorder during the operations described in FIG. 7.

Furthermore, FIG. 17 shows an image which is displayed when the sensing portion 32b is pressed in a state where the operation main menu 82 shown in FIG. 9 is being displayed. As shown in Table 1 and Table 2, if the control signal Sb is transmitted by pressing the sensing portion 32b, the control section 20 controls the recording section 50 so as to execute the instruction g2 of displaying a recording menu in response to the control signal Sb. As a result, as shown in FIG. 17, a recording menu 97 is displayed. In the recording menu 97, various videorecording scheduling settings can be executed.

Other than what is described above, the control device 100 is arranged so as to display an operation menu for selecting a signal to be input to the disk recorder 102 or an operation menu for selecting a signal to be output to the display device 104, thus to permit selection.

Figure 18:
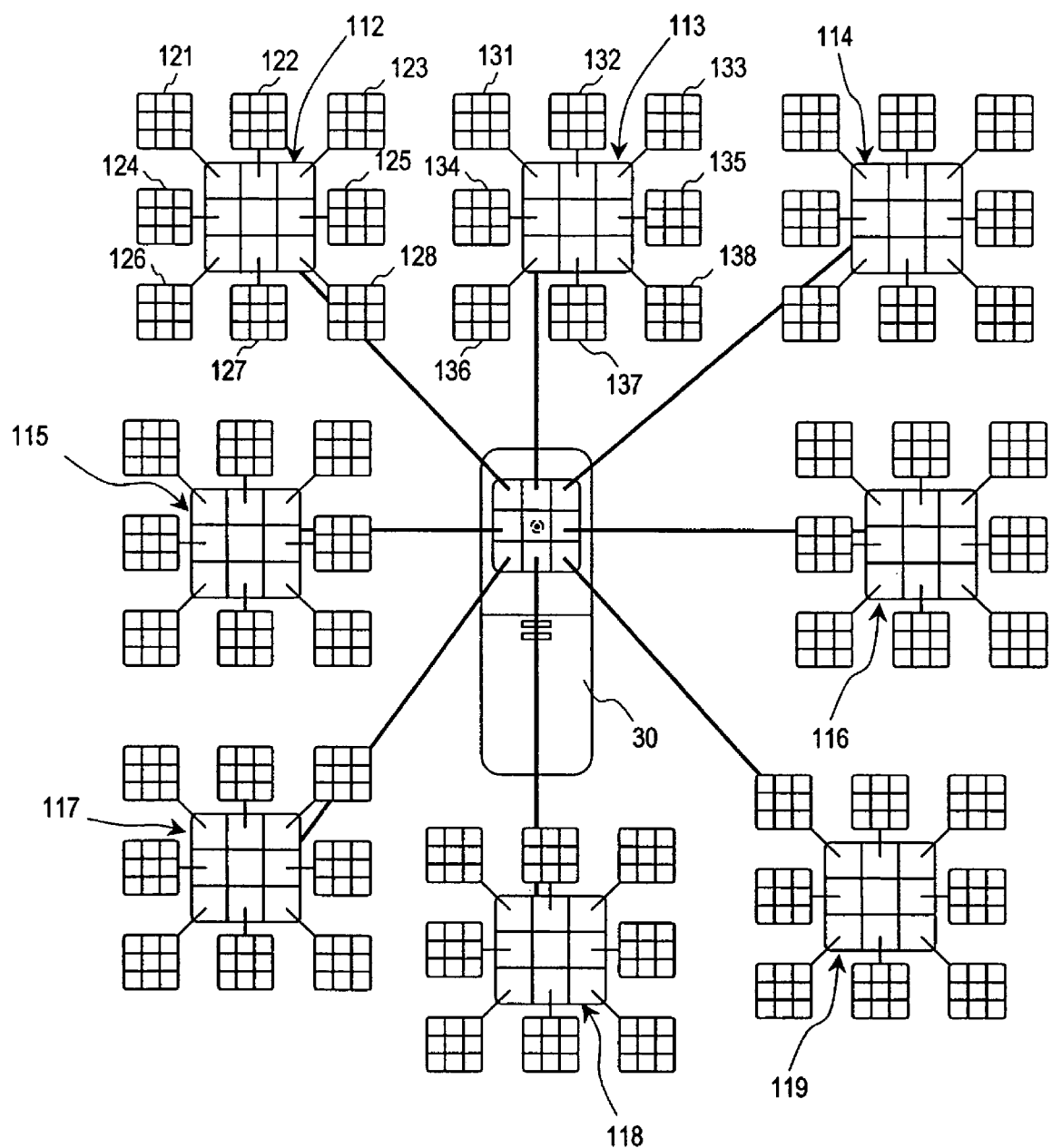
FIG. 18 is a diagram describing the number of functions that can be controlled by the control device shown in FIG. 1.

FIG. 18 is a diagram schematically showing the number of functions which can be executed with the control device of the present invention. The remote controller 30 includes nine sensing portions which are arranged in three rows by three columns, and the number of functions through which the disk recorder 102 can be directly operated with one press of one of the sensing portions is nine. However, as described above, a large number of operations can be realized by constructing the operation menus in a hierarchical manner and through plural presses of the sensing portions. Assuming that an instruction of returning to the operation menu which was being displayed immediately previously is to be assigned to one of the nine sensing portions, eight operation menus 112 to 119 can be displayed with a single press of a sensing portion on the remote controller 30. Moreover, eight functions are assign to each operation menu. As a result, through two presses of sensing portions, one of 64 (8×8) kinds of functions can be selected and executed.

Furthermore, in the case where one more press of a sensing portion can be allowed, eight more operation menus can be displayed for each of the operation menus 112 to 119. For example, from the operation menus 112 and 113, operation menus 121 to 128 and 131 to 138 may be further displayed. To each of the operation menus 121 to 128 and 131 to 138, eight functions are assigned. As a result, through three presses of the sensing portions, one of 512 (8×8×8) kinds of functions can be selected and executed. Thus, according to the present invention, there is realized a control device which can control an AV apparatus having a large number of functions with a small number of operable portions such as controlling buttons. Moreover, by reducing the number of operable portions, it becomes possible to control an AV apparatus without visually confirming the positions and functions of the operable portions.

In the case where the control device of the present invention needs to select one or more from among a large number of still pictures, moving pictures, or other image information, e.g., one of several tens of images or more than a hundred images which have been taken with a digital camera so as to be displayed on the screen of a display device, the below-described structure may be added to the control device as described above for providing enhanced operability.

Figure 19:
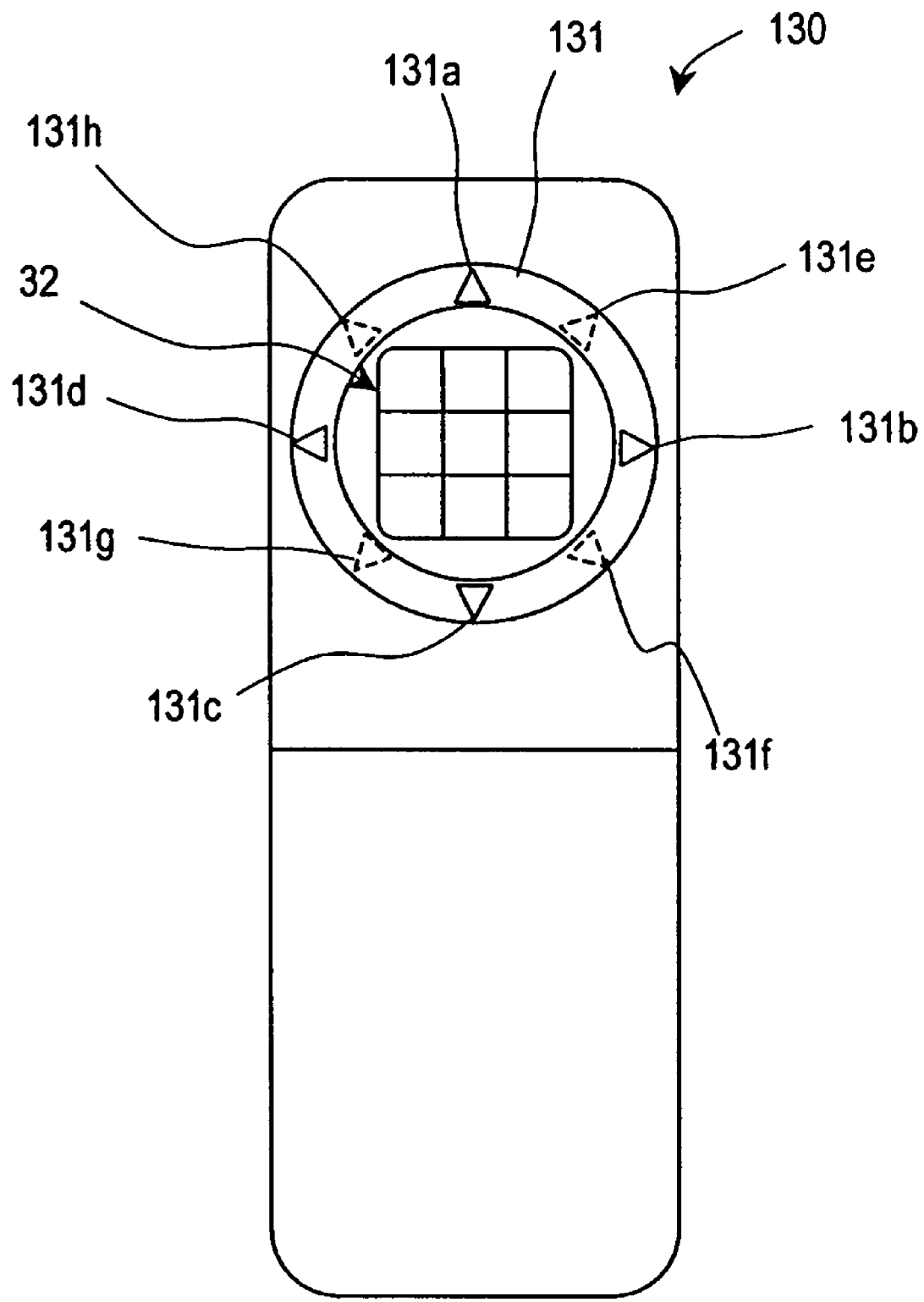
FIG. 19 is a plan view of an example of a preferable remote controller in the case where a thumbnail of a recorded image is to be selected.

FIG. 19 is a plan view showing an example of a preferable remote controller in the case where thumbnails of images which are recorded on a hard disk, a recordable-type DVD, a memory card or the like are to be selected. Around an input section 32, the remote controller 130 shown in FIG. 19 includes cursor movement sensing portions 131a, 131b, 131c and 131d, which are for moving a cursor. By operating the respective cursor movement sensing portions 131a, 131b, 131c and 131d, cursor control signals CSa, CSb, CSc and CSd are output from the remote controller 130. Although four cursor movement sensing portions 131a, 131b, 131c and 131d, for moving the cursor in the up/down/right/left directions on the screen of the display device, are provided in FIG. 19, cursor movement sensing portion 131e, 131f, 131g and 131h may further be comprised in order to move the cursor in oblique directions. In this case, by operating the cursor movement sensing portions 131e, 131f, 131g and 131h, cursor control signals CSe, CSf, CSg and CSh will be further output from the remote controller 130.

As shown in FIG. 19, the cursor movement sensing portions 131a, 131b, 131c and 131d are preferably placed around the input section 32. With such a placement, the user is able to guess the positions of the cursor movement sensing portions 131a, 131b, 131c and 131d by using the position of the input section 32 as a clue, thus being able to operate the cursor movement sensing portions also in the manner of a "touch system".

Figure 20:
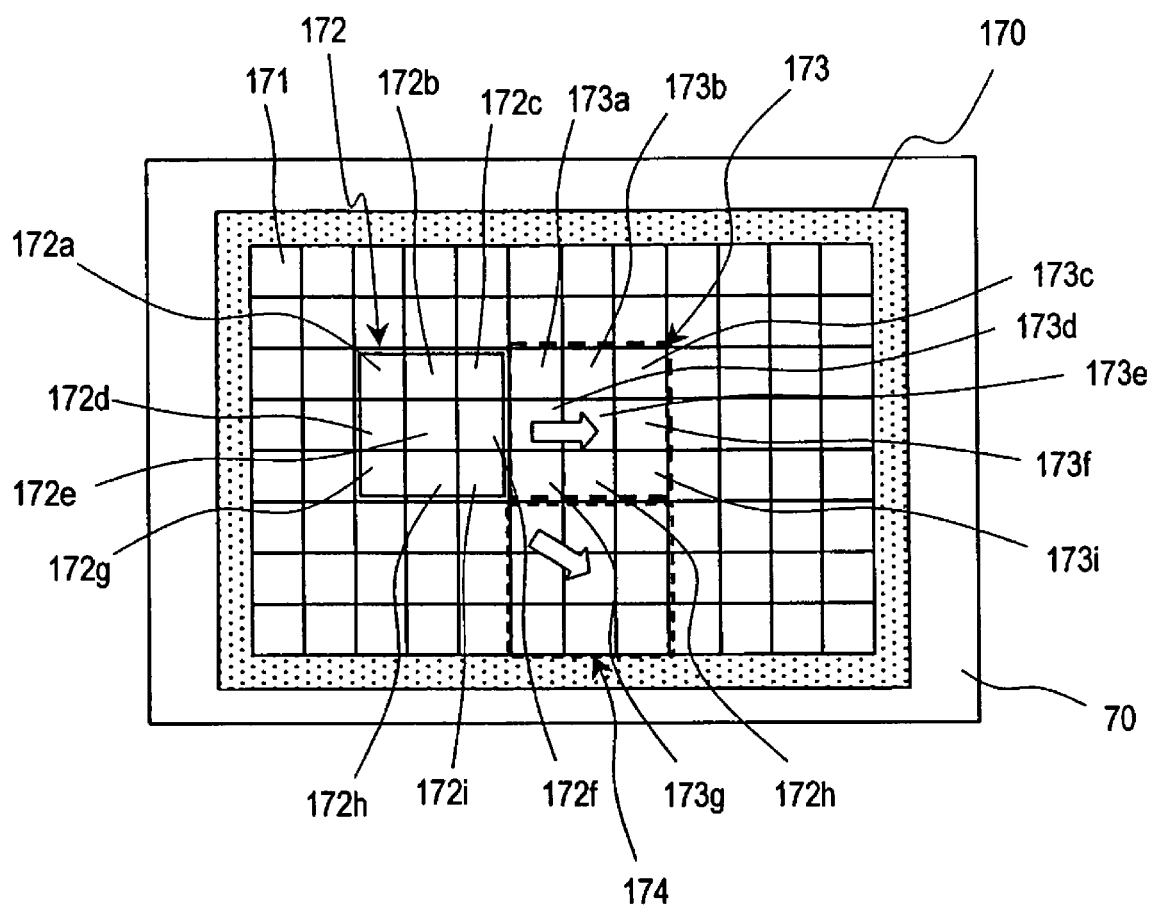
FIG. 20 shows an exemplary screen which is used in the case where a thumbnail of an image is to be selected.

FIG. 20 schematically shows a screen 70 on which thumbnails of images that are recorded on a storage medium such as a hard disk, a recordable-type DVD, or a memory card are being displayed. For example, as described with reference to FIG. 9, an instruction for displaying an image which is recorded on the storage medium may be assigned in the operation main menu 82, thus displaying the screen 70 shown in FIG. 20.

As shown in FIG. 20, the screen 70 includes thumbnails 170. The thumbnails 170 include reduced images 171 of a plurality of images which are recorded on the storage medium. The number M of reduced images 171 (where M is a natural number) is at least greater than the number N of sensing portions, and the reduced images 171 are placed in a matrix of plural vertical rows and plural horizontal rows. In the thumbnails 170, a cursor 172 which surrounds three rows by three columns of reduced images 171 are displayed in an overlay fashion. The region surrounded by the cursor 170 corresponds to the arrangement of the sensing portions constituting the input section 32 of the remote controller 130. Specifically, in the case where the sensing portions are arranged in three rows by three columns, the cursor 170 surrounds nine reduced images 171 which are placed in three rows by three columns. The cursor 170 simply needs to specify those reduced images 171 which correspond to the number and arrangement of sensing portions; instead of being surrounded within a frame, the specified reduced images 171 may be shown in a predetermined color.

The disk recorder corresponding to the remote controller 130 has a similar structure to that of FIG. 1. Image signals are read from the disk drive 52, memory card or the like (not shown) to the microprocessor 18, and the thumbnails 170 are generated by the image generating section 16. Alternatively, under the control of the microprocessor 18, the thumbnails 170 may be generated in the recording section 50, and output to the output image selection section 58.

The cursor 170 can be moved by operating the cursor movement sensing portions 131a, 131b, 131c and 131d. Specifically, when the cursor movement sensing portions 131a, 131b, 131c and 131d are activated, the corresponding cursor control signals CSa, CSb, CSc and CSd are transmitted from the remote controller 130 to the reception section 12. Based on the cursor control signal received by the reception section 12, the control section 22 generates the thumbnails 170, with the position of the cursor 170 thereon having been moved.

At this time, it is preferable that the cursor 170 moves in such a manner that the regions to be surrounded by the cursor 170 will never overlap. For example, it is preferable that, when the cursor movement sensing portion 131b is pressed once, the cursor 172 moves to a position of a cursor 173 shown by broken lines. As a result, a desired reduced image can be selected through a few operations even in the case where there is a large number of reduced images 170. Moreover, as shown in FIG. 19, in the case where cursor movement sensing portions 131e, 131f, 131g and 131h for making movements in oblique directions are provided on the remote controller 130, the cursor 172 can be moved to the position of a cursor 174 shown by broken lines when the cursor movement sensing portion 131f is pressed once.

Figure 21:
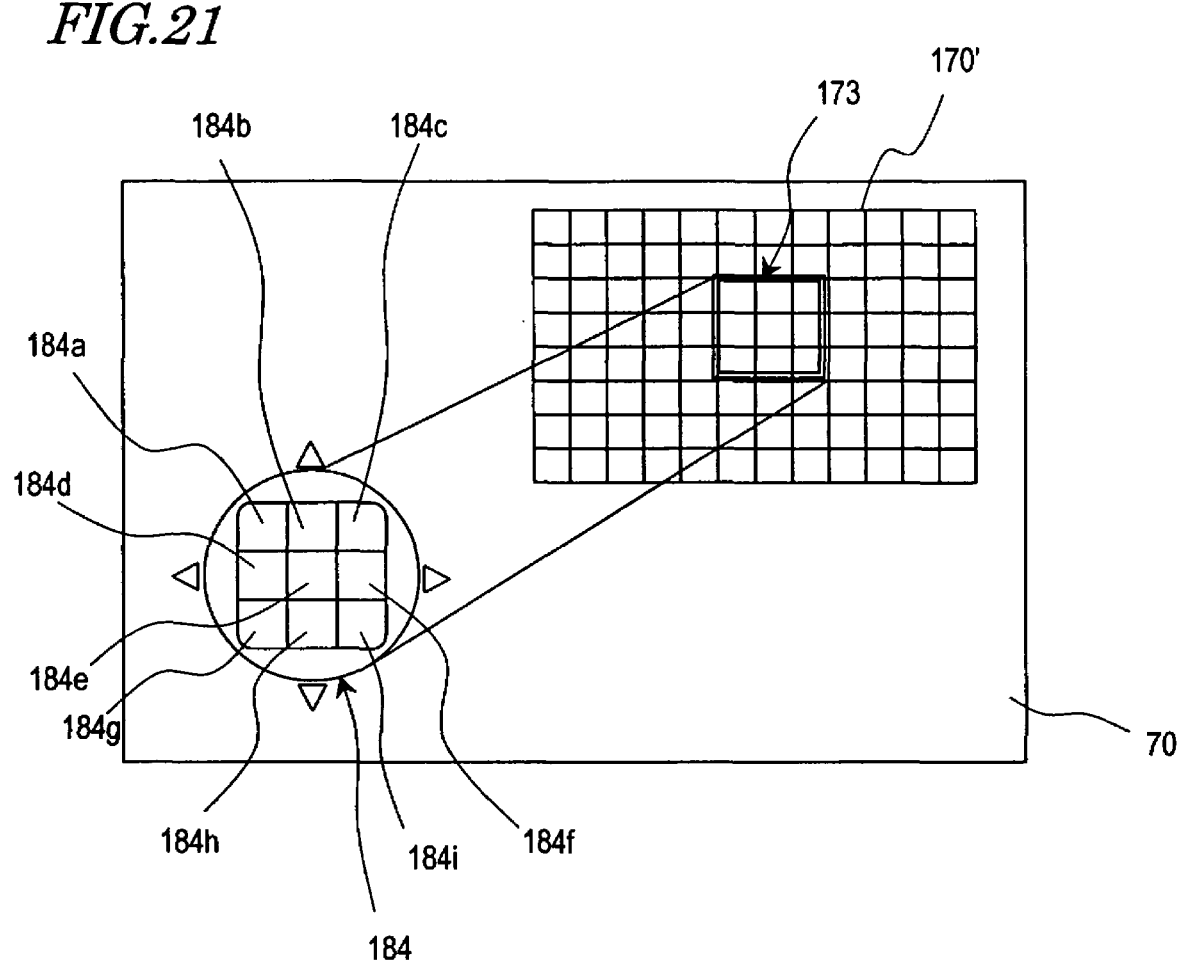
FIG. 21 shows another exemplary screen which is used in the case where a thumbnail of an image is to be selected.
Figure 22:
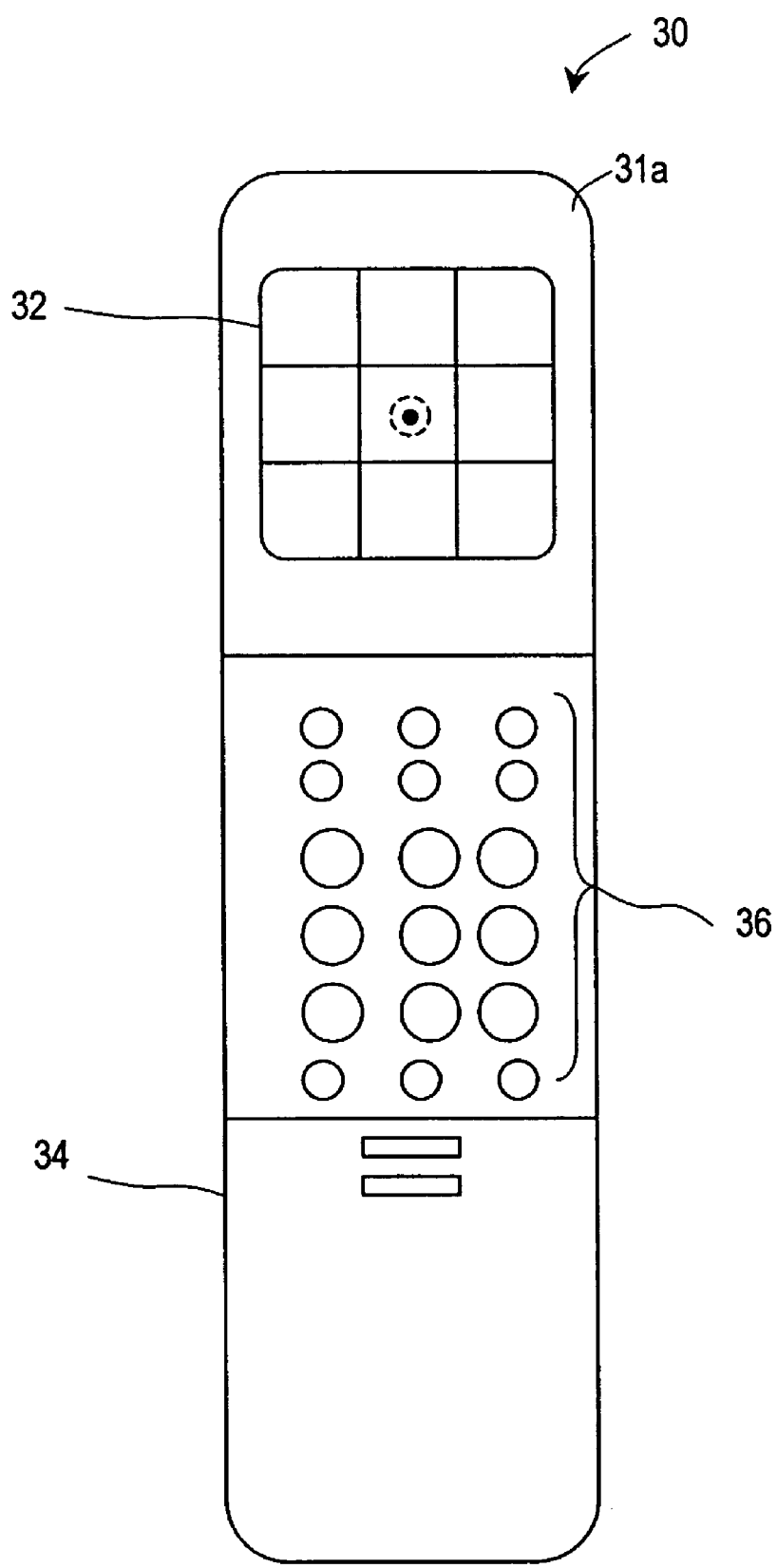
FIG. 22 is a plan view showing another example of a remote controller for sending instructions to the control device shown in FIG. 1.

In a state where the cursor 172 surrounds reduced images 172a to 172i, the control section 22 assigns the control signals and instructions in such a manner that, when a control signal from a sensing portion in a position corresponding to any of the reduced images 172a to 172i is received, the corresponding reduced image will be displayed in an enlarged mode. For example, when the uppermost and rightmost sensing portion on the remote controller 130 has been activated through user operation, the control section 22 controls the recording section 50 so as to display the reduced image 172c in an enlarged mode. Moreover, in the case where the cursor is at the position indicated as 173, when a control signal from a sensing portion in a position corresponding to any of the reduced images 173a to 173i is received, the corresponding reduced image is displayed in an enlarged mode. Note that, in the case where there is a large number of reduced images to be displayed on the screen 70, such that the area of each reduced image becomes too small, an enlarge image 184 of reduced images 184a to 184i which are surrounded by the thumbnails 170' and the cursor 173 may be displayed in accordance with the screen 70, as shown in FIG. 21.

Thus, each reduced image 171 signifies an instruction to display a reduced image in an enlarged mode, and, only to those reduced images 173a to 173i which have been selected with the cursor 172, control signals to be transmitted upon activation of sensing portions in the corresponding positions will be assigned. Therefore, the reduced images within the cursor, which has been moved to a desired position by means of the cursor movement sensing portions 131a, 131b, 131c and 131d (which are provided on the remote commander 130), correspond to the image regions as described above. The reduced images can be displayed in an enlarged mode through the hitherto-described procedure.

Besides displaying of thumbnails, the operation method which has been described with reference to FIG. 19 to FIG. 21 may be used for operation methods for controlling other functions of the disk recorder 102. Specifically, instead of reduced images 171, an image 171 which represents all instructions for the disk recorder 102, e.g., the group of instructions shown in Table 2, the group of instructions shown in Table 3, and the group of instructions shown in Table 4 for controlling the disk recorder 102, may be displayed in the image 70 shown in FIG. 20. Then, to the instructions represented by any nine images which have been selected with the cursor 172, nine control signals to be transmitted upon activation of the sensing portions in the corresponding positions may be assigned. According to such a method, an image 70 which represents a listing of operations for the disk recorder 102 is constructed. The user may select nine images having desired functions from within the image 70 by moving the cursor, and thereafter activate a sensing portion in the corresponding position, thus being able to cause the disk recorder 102 to execute the desired function. In this case, the image 171 may be differentiated in colors depending on the associated functions in order to classify the functions represented by the many images that are displayed, thus making it easy for the user to select a desired function. Moreover, as shown in FIG. 21, the images which are selected with the cursor may be displayed in an enlarged mode. In this case, the functions may be shown only in the form of symbols or icons in the respective regions of the image 170' representing the listing, while text explanations of the functions may be added to the enlarged image 184.

Although nine sensing portions are provided in the input section of the remote controller 30 of the above embodiment, ten or more sensing portions may be provided in the input section. Moreover, as for those setting conditions which do not require much change in normal use, e.g., setting of the current date and time and setting of the receivable broadcast stations, an input section other than the aforementioned nine sensing portions may be provided on the remote controller 30 in addition to the sensing portions 32a to 32i, in order to enable inputting via an input section other than the sensing portions. In FIG. 2, for example, such an input section may be provided inside a sliding cover 34 which is provided below the sensing portions 32a to 32i, so that they are hidden under the cover and cannot be operated by the user during normal usage. FIG. 17 is a plan view showing a state where the cover 34 is opened. On the main body 31 of the remote controller 30, an input section 36 for executing settings of the current date and time, receivable broadcast stations, etc., are provided below the sensing portions 32a to 32i.

Figure 23:
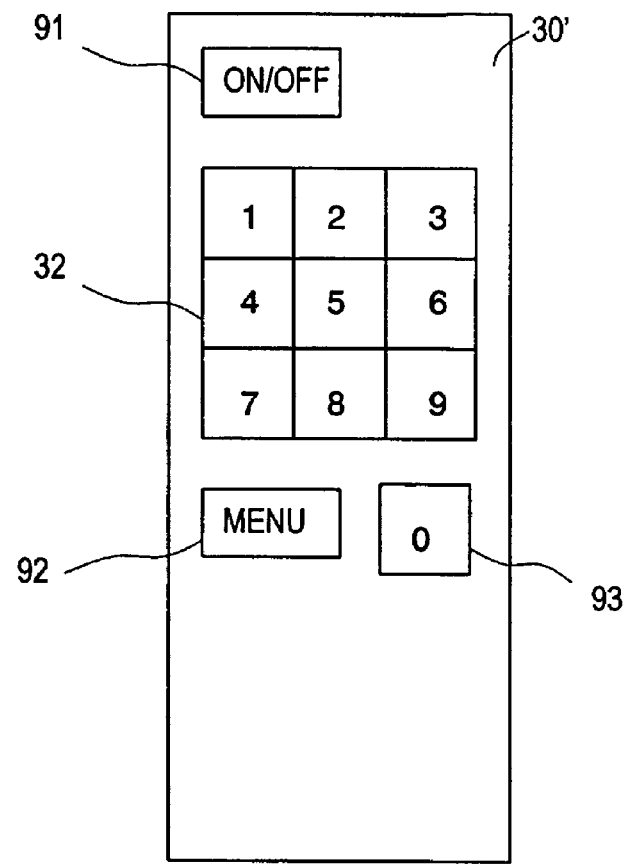
FIG. 23 is a plan view showing another example of a remote controller for sending instructions to the control device shown in FIG. 1.

Moreover, as shown in FIG. 23, a remote controller 30' may be adopted which has, in addition to the input section 32, a sensing portion 91 for powering ON/OFF the disk recorder 102 and a sensing portion 92 for displaying an operation main menu. In this case, numbers from "1" to "9" may be given to the sensing portions 32a to 32i, and a sensing portion 93 for inputting "0" may be further provided. By adopting such a structure, it becomes possible to switch between displaying/non-displaying of the operation main menu by means of the sensing portion 92. In another arrangement, through activation of the sensing portions 32a to 32i and the sensing portion 93 while no operation main menu is displayed on the display device 14, the numbers given to the respective sensing portions may be associated with the channel of a broadcast program, such that, by pressing the sensing portions 32a to 32i and the sensing portion 93, the channel number of the broadcast station can be directly input to enable channel selection.

Although the present embodiment has illustrated a control device which is incorporated in a disk recorder, the control device of the present invention can be suitably adopted for any other AV apparatus. Moreover, it can be suitably adopted in any multi-functional apparatus, other than an AV apparatus, that has an image display device, or any multi-functional apparatus, other than an AV apparatus, to be connected to an image display device.

INDUSTRIAL APPLICABILITY

According to the present invention, there is realized a control device which can control an AV apparatus having a large number of functions with a small number of operable portions such as controlling buttons. Moreover, by reducing the number of operable portions, it becomes possible to control an AV apparatus without visually confirming the positions and functions of the operable portions.

The control device of the present invention can be suitably adopted in any multi-functional apparatus, other than an AV apparatus, that has an image display device, or any multi-functional apparatus, other than an AV apparatus, to be connected to an image display device.

The invention claimed is:

1. A control device comprising:
a reception section for receiving a control signal from a transmission section which transmits, based on activation of N sensing portions (where N is an integer equal to or greater than two) placed in a predetermined arrangement, the control signal for giving an instruction to an apparatus to be controlled; and
a control section for assigning, to the N or less control signals, instructions to be executed when the control signals are received, and generating a signal for drawing on a display device an operation menu which includes N image regions placed in an arrangement corresponding to the N sensing portions of the transmission section, each image region representing an instruction assigned to a control signal which is transmitted when the corresponding sensing portion is pressed, the control section standing by to receive a control signal transmitted from the transmission section.

2. The control device of claim 1, wherein each instruction is a control instruction for the apparatus, or an instruction for assigning next instructions to the control signals in a next standby state and causing the control section to generate a signal for drawing next image regions to be included in a next operation menu.

3. The control device of claim 2, wherein the next instructions include detailed control instructions for the apparatus concerning the instruction.

4. The control device of claim 2, wherein the next operation menu includes at least one of the image regions in a current standby state as well as the next image regions to be displayed in the next standby state.

5. The control device of claim 3, wherein the operation menu includes information other than instructions related to the apparatus to be operated.

6. The control device of claim 1, wherein N is nine, and the N image regions are arranged in three rows by three columns.

7. The control device of claim 2, wherein the operation menu is displayed in different colors depending on the standby state.

8. The control device of claim 2, wherein the operation menu is displayed at a different position on a screen of the display device depending on the standby state.

9. The control device of claim 1, wherein the control section comprises a memory for storing information representing an operation state of the apparatus to be controlled in the standby state.

10. The control device of claim 1, wherein one of the instructions assigned to the control signals is an instruction for maintaining a state of the apparatus to be controlled.

11. The control device of claim 1, wherein the control section assigns an instruction to each of the N control signals resulting from activation of the N sensing portions.

12. The control device of claim 1, wherein the instructions to be assigned to the control signals are determined based on an operation state of the apparatus to be controlled in the standby state and the operation menu generated in an immediately previous standby state.

13. The control device of claim 1, wherein, a cursor control signal for moving a cursor is transmitted from the transmission section, and the control section generates a signal for drawing on the display device an image including:
M image regions (where M is a natural number greater than N) each representing an instruction for the apparatus to be controlled; and a cursor which moves in accordance with the cursor control signal to specify the N image regions, and assigns instructions represented by the image regions specified by the cursor to control signals from the sensing portions corresponding to the image regions.

14. A control system comprising:
the control device of claim 1; and
a controller including the transmission section and the N sensing portions.

15. A control system comprising:
the control device of claim 13; and
a controller including the transmission section and the N sensing portions as well as a cursor movement sensing portion for moving the cursor.

16. The control system of claim 14, wherein the controller transmits the control signals by using infrared rays, ultrasonic waves, or radio waves as a carrier.

17. The control system of claim 14, wherein the N sensing portions are arranged in three rows by three columns.

18. The control system of claim 17, wherein a surface of a sensing portion which is positioned at the second row in the second column among the N sensing portions arranged in three rows by three columns feels differently from the other sensing portions.

19. The control system of claim 14, wherein the controller further includes a sensing portion for powering ON/OFF the apparatus to be controlled.

20. An audio-visual apparatus including the control system of claim 14.

21. A control method for transmitting, based on activation of N sensing portions (where N is an integer equal to or greater than two) placed in a predetermined arrangement, a control signal for giving an instruction to an apparatus to be controlled, and controlling the apparatus with the control signal, comprising:
a step of assigning, to the N or less control signals, instructions to be executed when the control signals are received; and
a step of generating a signal for drawing on a display device an operation menu which includes N image regions placed in an arrangement corresponding to the N sensing portions of the transmission section, each image region representing an instruction assigned to a control signal which is transmitted when the corresponding sensing portion is pressed.

22. The control method of claim 21, wherein each instruction is a control instruction for the apparatus, or an instruction for assigning next instructions to the control signals in a next standby state and causing the control section to generate a signal for drawing next image regions to be included in a next operation menu.

23. The control method of claim 21, wherein the next instructions include detailed control instructions for the apparatus concerning the instruction.

24. The control method of claim 21, wherein the next operation menu includes at least one of the image regions in a current standby state as well as the next image regions to be displayed in the next standby state.

25. The control method of claim 23, wherein the operation menu includes other information concerning the image regions and the apparatus to be operated.

26. The control method of claim 21, wherein N is nine, and the sensing portions are arranged in three rows by three columns.

27. The control method of claim 21, wherein the operation menu is displayed in different colors depending on the standby state.

28. The control method of claim 22, wherein the operation menu is displayed at a different position on a screen of the display device depending on the standby state.

29. The control method of claim 21, wherein the control section comprises a memory for storing information representing a current operation state of the apparatus to be controlled in the standby state.

30. The control method of claim 21, wherein one of the instructions assigned to the control signals is an instruction for maintaining a state of the apparatus to be controlled.

31. The control method of claim 21, wherein, the step of generating a signal generates a signal for drawing on the display device an image including: M image regions (where M is a natural number greater than N) each representing an instruction for the apparatus to be controlled; and a cursor which moves in accordance with a cursor control signal to specify the N image regions, and the step of assigning assigns instructions represented by the image regions specified by the cursor to control signals from the sensing portions corresponding to the image regions.

32. The control method of claim 21, wherein the step of assigning assigns an instruction to each of the N control signals resulting from activation of the N sensing portions.

33. The control method of claim 21, wherein, in the step of assigning, the instructions to be assigned to the control signals are determined based on an operation state of the apparatus to be controlled in the standby state and the operation menu generated in an immediately previous standby state.

* * * * *

UNITED STATES PATENT AND TRADEMARK OFFICE
CERTIFICATE OF CORRECTION

PATENT NO. : 7,880,813 B2  Page 1 of 1
APPLICATION NO. : 10/569294
DATED : February 1, 2011
INVENTOR(S) : Masakazu Nakamura et al.

It is certified that error appears in the above-identified patent and that said Letters Patent is hereby corrected as shown below:

Title Page, Section (65) Prior Publication Data, insert -- US 60/499,032   Aug. 29, 2003 --.

Signed and Sealed this
Nineteenth Day of April, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,880,813 B2 | Page 1 of 1 |
| APPLICATION NO. | : 10/569294 | |
| DATED | : February 1, 2011 | |
| INVENTOR(S) | : Masakazu Nakamura et al. | |

It is certified that error appears in the above-identified patent and that said Letters Patent is hereby corrected as shown below:

Title Page, Section (60) Related U.S. Application Data, insert -- Provisional application No. 60/499,032, filed on Aug. 29, 2003 --.

This certificate supersedes the Certificate of Correction issued April 19, 2011.

Signed and Sealed this
Thirty-first Day of May, 2011

David J. Kappos
*Director of the United States Patent and Trademark Office*